(12) United States Patent
Choi et al.

(10) Patent No.: US 12,039,691 B2
(45) Date of Patent: Jul. 16, 2024

(54) METHOD OF COMPENSATING DISPLAY DEVICE

(71) Applicant: LG Display Co., Ltd., Seoul (KR)

(72) Inventors: Min-Gyu Choi, Paju-si (KR); Se-Jin Lee, Paju-si (KR); Dong-Hyeok Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 78 days.

(21) Appl. No.: 17/985,523

(22) Filed: Nov. 11, 2022

(65) Prior Publication Data

US 2023/0186426 A1    Jun. 15, 2023

(30) Foreign Application Priority Data

Dec. 9, 2021 (KR) .................. 10-2021-0175634
Oct. 25, 2022 (KR) .................. 10-2022-0137944

(51) Int. Cl.
G06T 3/20 (2006.01)
G06T 3/40 (2024.01)
G06T 5/92 (2024.01)

(52) U.S. Cl.
CPC .............. G06T 3/20 (2013.01); G06T 3/40 (2013.01); G06T 5/92 (2024.01); *G06T 2210/22* (2013.01)

(58) Field of Classification Search
CPC .... G06T 3/20; G06T 5/92; G06T 3/40; G06T 2210/22
See application file for complete search history.

(56) References Cited

U.S. PATENT DOCUMENTS

| | | |
|---|---|---|
| 11,327,498 B2 | 5/2022 | Zhu et al. |
| 2021/0049966 A1* | 2/2021 | Hsu ................ G09G 3/3258 |
| 2021/0181756 A1 | 6/2021 | Zhu et al. |

FOREIGN PATENT DOCUMENTS

| | | | | |
|---|---|---|---|---|
| JP | 2005331929 A | * | 12/2005 | ............. G09G 3/006 |
| JP | 2010266502 A | * | 11/2010 | |
| KR | 10-2020-0083376 A | | 7/2020 | |
| KR | 10-2020-0084419 A | | 7/2020 | |

* cited by examiner

*Primary Examiner* — Xin Sheng
(74) *Attorney, Agent, or Firm* — Fenwick & West LLP

(57) ABSTRACT

A method of compensating a display device includes: displaying a first display image of a calibration pattern; generating a first photograph image of the calibration pattern by capturing the first display image; generating a measurement representative position data corresponding to the calibration pattern by measuring the first photograph image; generating a third-order fitting representative position data by performing a two-dimensional third-order fitting; displaying a second display image of a full white display; generating a second photograph image of the full white display by capturing the second display image; generating a first crop image by performing a size adjustment based on the third-order fitting representative position data; calculating a luminance compensation value by comparing a measured luminance of the first crop image with a target luminance; and generating a compensated image data by applying the luminance compensation value to an image data.

9 Claims, 22 Drawing Sheets

FIG. 6C
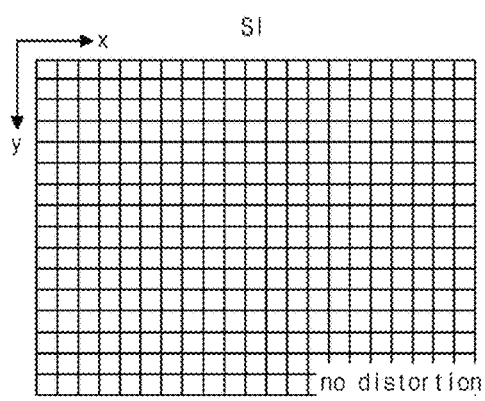
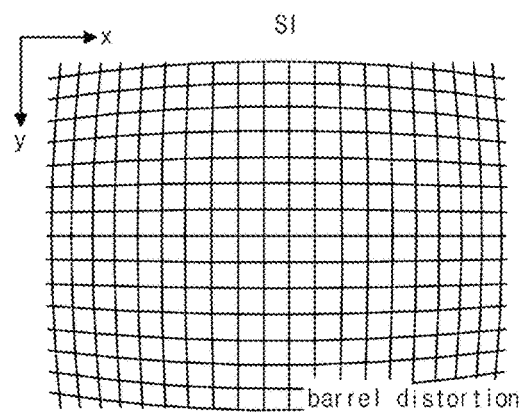
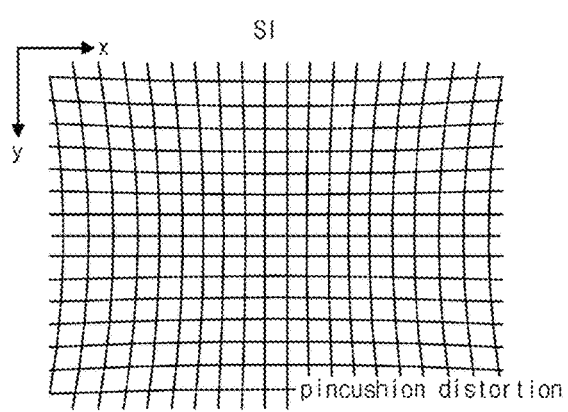

FIG. 15

| | case 1 | case 2 | case 3 | case 4 |
|---|---|---|---|---|
| crop subpixel (CSP) arrangement | S(B) at top, S(G) left, S(R) bottom with xb, yb, xr, yr | S(R) at top, S(G) right, S(B) bottom with yr, xr, yb, xb | S(G) S(B) S(R) horizontal with xb, xr | S(R) top, S(B) middle, S(G) bottom with yr, yb |
| reference position | • Green coordinate | • Green coordinate | • Green coordinate | • Green coordinate |
| S(G) | • $S(G) = (S_x, S_y)$ | • $S(G) = (S_x, S_y)$ | • $S(G) = (S_x, S_y)$ | • $S(G) = (S_x, S_y)$ |
| S(B) | • $S(B) = (S_x+x_b, S_y+y_b)$ <br> → $0 < x_b \leq 2$, $-2 \leq y_b < 0$ | • $S(B) = (S_x+x_b, S_y+y_b)$ <br> → $-2 \leq x_b < 0$, $0 \leq y_b < 2$ | • $S(B) = (S_x+x_b, S_y)$ <br> → $0 \leq x_b < 2$ | • $S(B) = (S_x, S_y+y_b)$ <br> → $-2 \leq y_b < 0$ |
| S(R) | • $S(R) = (S_x+x_r, S_y+y_r)$ <br> → $0 < x_r \leq 2$, $0 < y_r \leq 2$ | • $S(R) = (S_x+x_r, S_y+y_r)$ <br> → $-2 \leq x_r < 0$, $-2 \leq y_r < 0$ | • $S(R) = (S_x+x_r, S_y)$ <br> → $0 \leq x_r < 2$ | • $S(R) = (S_x, S_y+y_r)$ <br> → $-2 \leq y_r < 0$ |

METHOD OF COMPENSATING DISPLAY DEVICE

CROSS-REFERENCE TO RELATED APPLICATION

The present application claims the priority benefit of Republic of Korea Patent Application No. 10-2021-0175634 filed on Dec. 9, 2021, and Republic of Korea Patent Application No. 10-2022-0137944 filed on Oct. 25, 2022, each of which is hereby incorporated by reference in its entirety.

BACKGROUND

Field of the Disclosure

The present disclosure relates to a method of compensating a display device, and more particularly, to a method of compensating a display device where a defect compensation effect of a camera compensation is maximized due to an improved position accuracy.

Description of the Background

As an information-oriented society progresses, demand for a display device displaying an image have increased with various forms. In a display device field, a cathode ray tube (CRT) having a relatively large volume has been rapidly replaced by a flat panel display (FPD) device having a thin profile, a light weight and applicable to a relatively large size. The FPD device includes a liquid crystal display (LCD) device, a plasma display panel (PDP), an organic light emitting diode (OLED) display device and a field emission display (FED) device.

Among the FPD devices, the OLED display device displays an image using a light emitting diode emitting a light corresponding to a data voltage. Since an emitting layer of the light emitting diode is formed of an organic material, the light emitting diode has a luminance deviation in the display panel and the luminance deviation causes deterioration such as a stain.

To solve the above problem, a camera compensation method where a positional luminance is detected by capturing a displayed image of a completed display panel with a camera and image data is modulated to compensate for a deviation of the positional luminance has been suggested.

In the camera compensation method, since a resolution of a plurality of display subpixels of a display panel and a resolution of a plurality of sensor subpixels of a camera are not equal to each other, a mapping is performed to a photograph image of the camera to correspond to a display image of the display panel.

However, since an accuracy of position data is reduced due to various causes, a position of a defect of the photograph image becomes inaccurate in a region where a modulation transfer function (MTF) representing reproducibility of the photograph image of the camera with respect to the display image of the display panel has a relatively high value.

As a result, the defect of the display panel is not compensated. Further, since a portion having no defect is distorted, a compensation effect is reduced and a display quality of an image is deteriorated.

SUMMARY

Accordingly, the present disclosure is directed to a method of compensating a display device that substantially obviates one or more of the problems due to limitations and disadvantages of the related art.

Also, the present disclosure is to provide a method of compensating a display device where an error of a position data is removed to increase a continuity, reduce a deviation and maximize a defect compensation effect by performing a two-dimensional third-order polynomial fitting to the generated position data.

In addition, the present disclosure is to provide a method of compensating a display device where an alignment of a position data and a kernel is improved to reduce a deviation between photograph images and maximize a defect compensation effect by performing a shifting through a symmetry calculation to the generated position data.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a method of compensating a display device includes: displaying a first display image of a calibration pattern using a display device, the display device including a plurality of display subpixels; generating a first photograph image of the calibration pattern by capturing the first display image using a camera, the camera including a plurality of sensor subpixels; generating a measurement representative position data corresponding to the calibration pattern by measuring the first photograph image; generating a third-order fitting representative position data by performing a two-dimensional third-order fitting for the measurement representative position data; displaying a second display image of a full white display using the display device; generating a second photograph image of the full white display by capturing the second display image using the camera; generating a first crop image by performing a first size adjustment of the second photograph image based on the third-order fitting representative position data; calculating a luminance compensation value by comparing a measured luminance of the first crop image with a target luminance; and generating a compensated image data by applying the luminance compensation value to an image data.

In another aspect, a method of compensating a display device includes: displaying a first display image of a calibration pattern using a display device, the display device including a plurality of display subpixels; generating a first photograph image of the calibration pattern by capturing the first display image using a camera, the camera including a plurality of sensor subpixels; generating a measurement representative position data corresponding to the calibration pattern by measuring the first photograph image; displaying a second display image of a partial point using the display device; generating a second photograph image of the partial point by capturing the second display image using the camera; calculating an optimum shift value by performing a shifting for the second photograph image; generating a shifting representative position data by adding the optimum shift value to the measurement representative position data; displaying a third display image of a full white display using the display device; generating a third photograph image of the full white display by capturing the third display image using the camera; generating a first crop image by performing a size adjustment for the third photograph image based on the shifting representative position data; calculating a luminance compensation value by comparing a measured luminance of the first crop image with a target luminance; and generating a compensated image data by applying the luminance compensation value to an image data.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate aspects of the disclosure and together with the description serve to explain the principles of the disclosure.

In the drawings:

FIG. 6C is a view showing a distortion of a photograph image of a display device according to an embodiment of the present disclosure;

FIG. 15 is a view showing a crop subpixel and a distribution of an optimum shift value of a display device according to an embodiment of the present disclosure.

DETAILED DESCRIPTION

Figure 1:
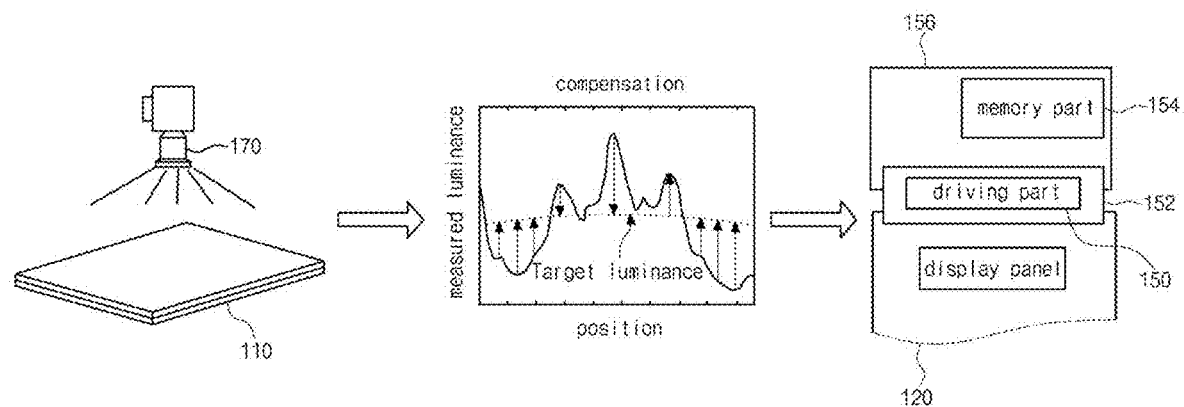
FIG. 1 is a view showing a method of compensating a display device according to an embodiment of the present disclosure.

Reference will now be made in detail to aspects of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following example aspects described with reference to the accompanying drawings. The present disclosure may, however, be embodied in different forms and should not be construed as limited to the example aspects set forth herein. Rather, these example aspects are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing aspects of the present disclosure are merely an example. Thus, the present disclosure is not limited to the illustrated details. Same reference numerals refer to same elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range. In describing a position relationship, when a position relation between two parts is described as, for example, "on," "over," "under," or "next," one or more other parts may be disposed between the two parts unless a more limiting term, such as "just" or "direct(ly)," is used.

In describing a time relationship, when the temporal order is described as, for example, "after," "subsequent," "next," or "before," a case which is not continuous may be included unless a more limiting term, such as "just," "immediate(ly)," or "direct(ly)," is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of aspects, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and aspects of the present disclosure are not limited thereto.

Features of various aspects of the present disclosure may be partially or overall coupled to or combined with each other, and may be variously inter-operated with each other and driven technically as those skilled in the art can sufficiently understand. Aspects of the present disclosure may be carried out independently from each other, or may be carried out together in co-dependent relationship.

Reference will now be made in detail to the present disclosure, examples of which are illustrated in the accompanying drawings.

FIG. 1 is a view showing a method of compensating a display device according to an embodiment of the present disclosure. The display device may include an organic light emitting diode (OLED) display device.

In FIG. 1, a camera 170 is disposed over a display panel 120 of a display device 110 according to an embodiment of the present disclosure. The camera 170 shoots (e.g., captures or senses) a display image displayed by the display panel 120 to generate a photograph image of the display image where the photograph image includes a positional measured luminance.

The display image may correspond to a case where all of a plurality of display subpixels of the display panel 120 emit light to generate a predetermined image such as a full white display or a white image.

Next, a positional luminance compensation value is calculated by comparing the positional measured luminance with a target luminance.

For example, a positive luminance compensation value may be calculated when the measured luminance is less than the target luminance, and a negative luminance compensation value may be calculated when the measured luminance is greater than the target luminance.

Next, the calculated positional luminance compensation value is stored in a memory part 154 of a printed circuit board 156 of the display device 110. A driving part 150 of a flexible printed circuit 152 of the display device 110 generates a compensated image data by applying the positional luminance compensation value of the memory part 154 to an image data and supplies a data voltage according to the compensated image data to the display panel 120.

For example, the driving part 150 may generate the compensated image data by increasing a gray level of the image data corresponding to the positive positional luminance compensation value and may generate the compensated image data by decreasing a gray level of the image data corresponding to the negative positional luminance compensation value.

As a result, a luminance deviation of the display device 110 is reduced and a display quality of the image is improved through the camera compensation method.

In the display device 110, a resolution of the plurality of display subpixels of the display panel 120 and a resolution of a plurality of sensor subpixels of the camera 170 are different from each other. As a result, after an entire position data including a golden position corresponding to the display subpixel is generated by shooting (e.g., capturing) a calibration pattern, a mapping is performed to the photograph image of the camera 170 based on the entire position data to correspond to the display image of the display panel.

Figure 2:
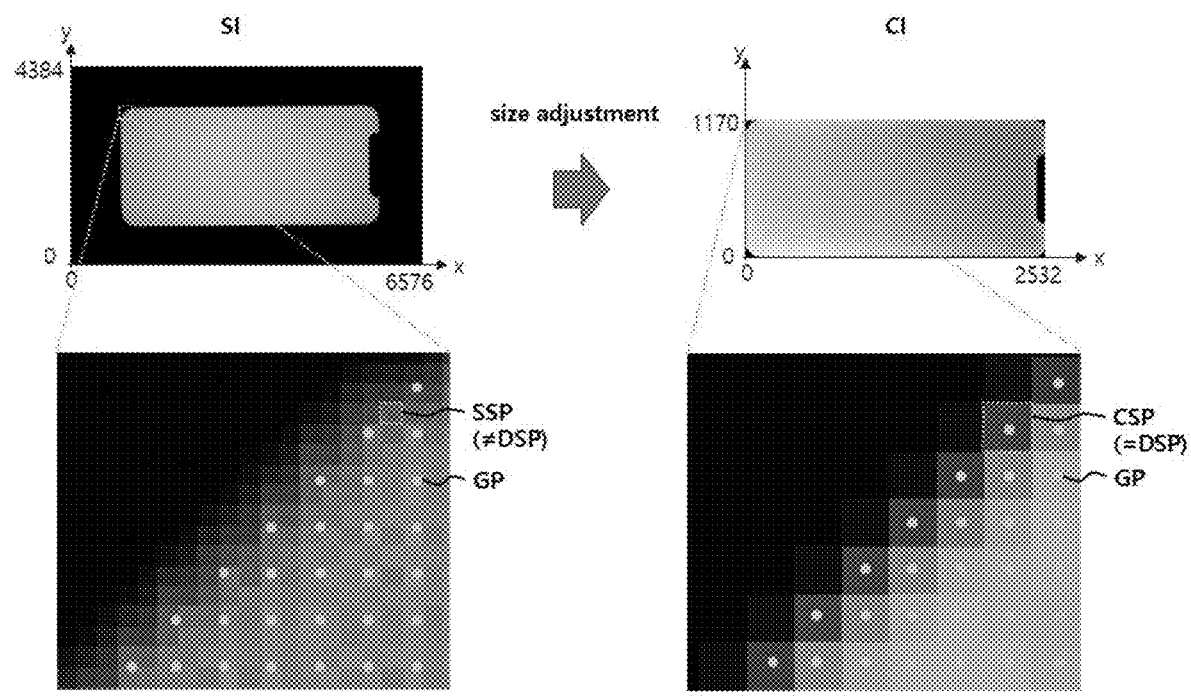
FIG. 2 is a view showing a photograph image and a crop image of a display device according to an embodiment of the present disclosure.

FIG. 2 is a view showing a photograph image and a crop image of a display device 110 according to an embodiment of the present disclosure.

In FIG. 2, the photograph image SI of the camera 170 (of FIG. 1) for the display panel 120 (of FIG. 1) of the display device 110 (of FIG. 1) according to an embodiment of the present disclosure includes the plurality of sensor subpixels SSP. For example, the plurality of sensor subpixels SSP of 6576 and 4384 may be disposed along an x-axis and a y-axis, respectively.

Since the resolution of the display panel 120 and the resolution of the camera 170 are different from each other, a size and a number of the plurality of sensor subpixels SSP of the photograph image SI may be different from a size and a number of the plurality of display subpixels DSP of the display panel 120. As a result, a golden position GP (e.g., a center position) corresponding to each of the plurality of display subpixels DSP is not located at a center of each of the plurality of sensor subpixels SSP. That is, the center position of each display subpixel DSP does not correspond to the center position of the corresponding sensor subpixel SSP.

Next, a mapping where a crop image CI is generated by adjusting (cropping) a size of the photograph image SI to correspond to the display panel 120 is performed.

The crop image CI includes a plurality of crop subpixels CSP. For example, the plurality of crop subpixels CSP of 2532 and 1170 may be disposed along an x-axis and a y-axis, respectively.

The plurality of crop subpixels CSP of the crop image CI may correspond to the plurality of display subpixels DSP of the display panel 120. The golden position GP corresponding to each of the plurality of display subpixels DSP is located on the center of each of the plurality of crop subpixels CSP.

As a result, a position of a defect of the display panel 120 may be accurately detected by analyzing the crop image CI.

The mapping to the photograph image SI may be performed based on a representative position data generated from a calibration pattern.

Figure 3:
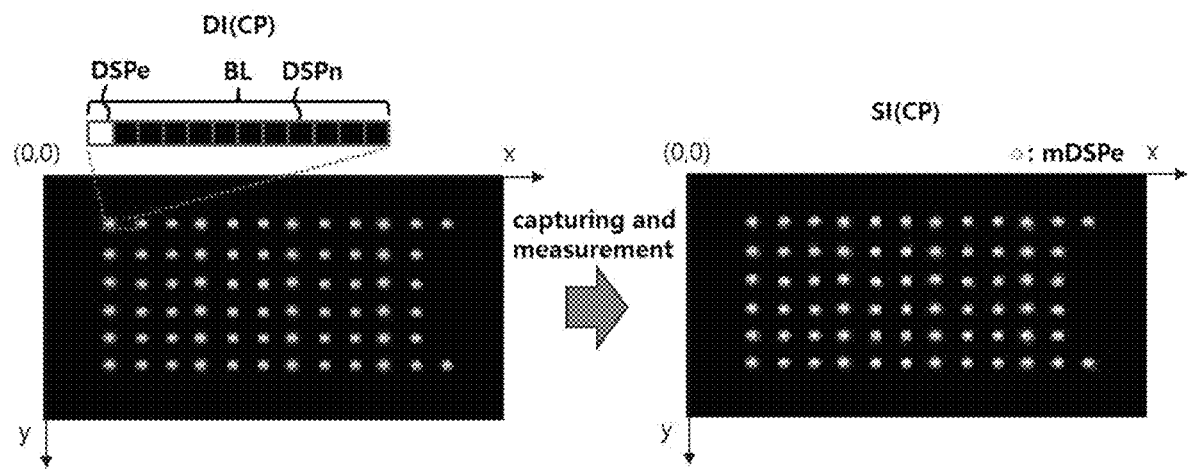
FIG. 3 is a view showing a display image and a photograph image of a display device according to an embodiment of the present disclosure.

FIG. 3 is a view showing a display image and a photograph image of a display device according to an embodiment of the present disclosure.

In FIG. 3, the display image of the display panel 120 displaying a calibration pattern CP includes a plurality of blocks BL arranged along a x-axis and a y-axis. Each of the plurality of blocks BL includes one emission display subpixel DSPe and a plurality of non-emission display subpixels DSPn.

For example, each block BL may include twelve display subpixels DSP of one emission display subpixel DSPe and eleven non-emission display subpixels DSPn.

The photograph image SI of the calibration pattern CP is generated by shooting (e.g., capturing) the display panel 120 with the camera 170, a measurement emission display subpixel mDSPe corresponding to the emission display subpixel DSPe of each block BL is detected as the golden position GP of a reference point by measuring the photograph image SI, and a representative position data including the golden position of a reference point is generated.

Further, the golden positions corresponding to all of the display subpixels DSP is calculated by dividing a distance between the measured emission display subpixels mDSPe of the adjacent two blocks BL with an equal interval, and the entire position data including all of the golden positions GP is generated.

For example, two golden positions GP corresponding to two measurement emission display subpixel mDSPe and eleven golden positions GP between two measurement emission display subpixel mDSPe may be calculated by dividing a distance between the two measurement emission display subpixels mDSPe of the two adjacent blocks BL into twelve equal parts. The one golden position GP of the reference point of each block BL may be detected from the photograph image SI, and the other eleven golden positions GP of each block BL may be calculated by dividing each block BL into the equal parts.

As a result, the entire position data of the display panel 120 is generated by calculating all of the golden positions GP along an x-axis and a y-axis from the plurality of blocks BL.

A difference between an ideal representative position data and a measured representative position data may be minimized through a fitting.

Figure 4A:
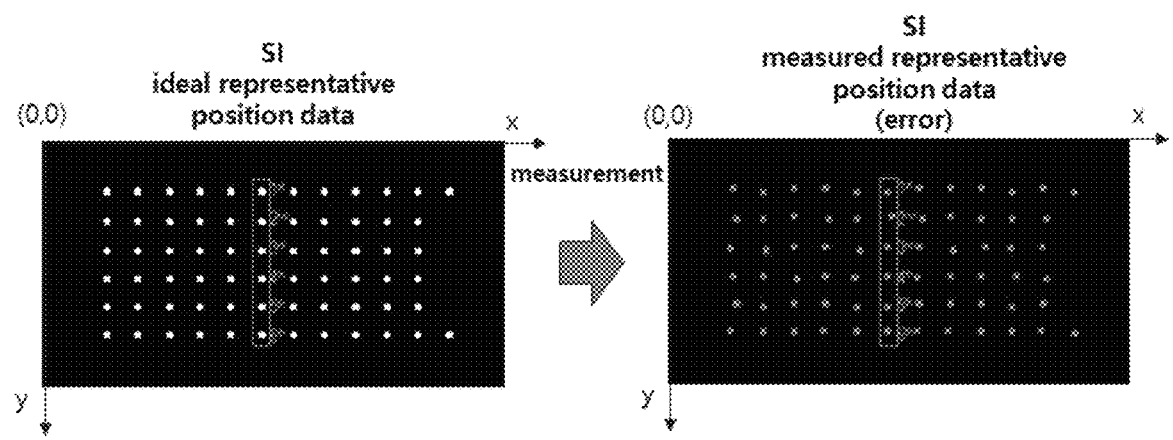
FIG. 4A is a view showing an ideal representative position data and a measured representative position data reflecting a measurement error of a display device according to an embodiment of the present disclosure.
Figure 4B:
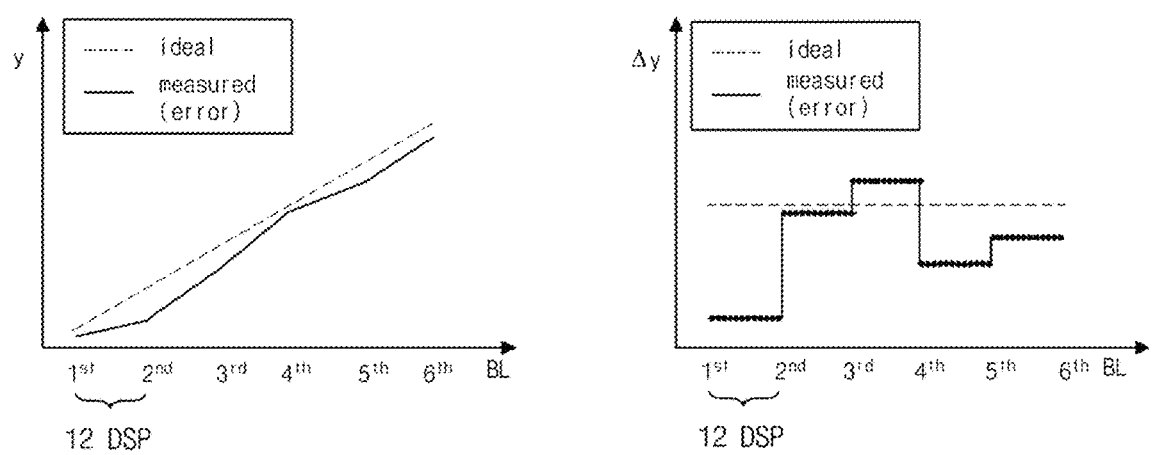
FIG. 4B is a view showing a y-axis coordinate and a y-axis interval of an ideal representative position data and a measured representative position data reflecting a measurement error of a display device according to an embodiment of the present disclosure.
Figure 5A:
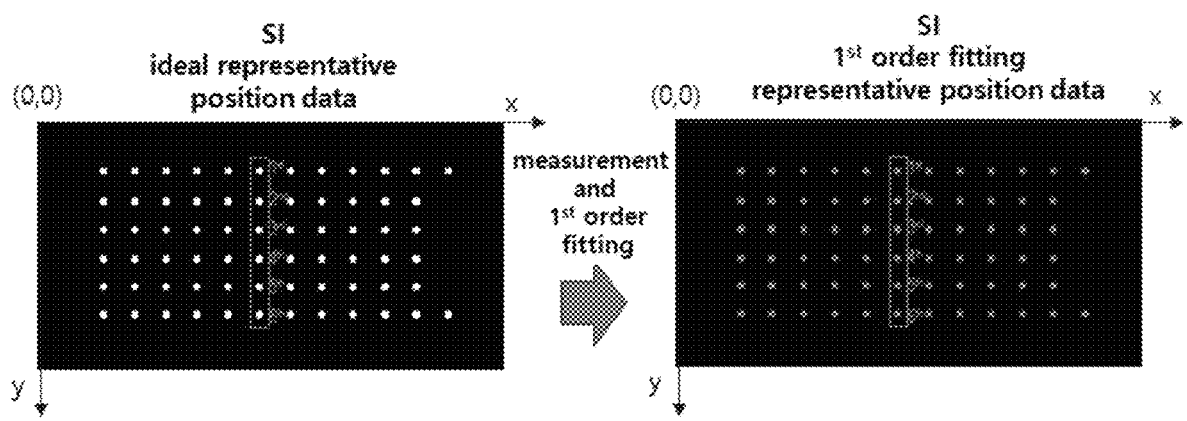
FIG. 5A is a view showing an ideal representative position data and a first-order fitting representative position data of a display device according to an embodiment of the present disclosure.
Figure 5B:
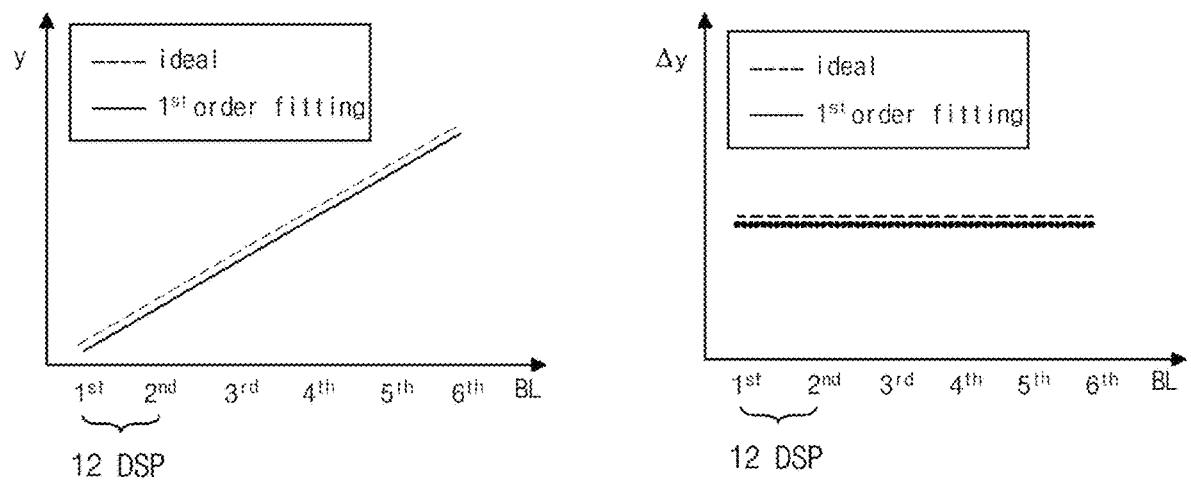
FIG. 5B is a view showing a y-axis coordinate and a y-axis interval of an ideal representative position data and a first-order fitting representative position data of a display device according to an embodiment of the present disclosure.

FIG. 4A is a view showing an ideal representative position data and a measured representative position data reflecting a measurement error of a display device according to an embodiment of the present disclosure, and FIG. 4B is a view showing a y-axis coordinate and a y-axis interval of an ideal representative position data and a measured representative position data reflecting a measurement error of a display device according to an embodiment of the present disclosure. FIG. 5A is a view showing an ideal representative position data and a first-order fitting representative position data of a display device according to an embodiment of the present disclosure, and FIG. 5B is a view showing a y-axis coordinate and a y-axis interval of an ideal representative position data and a first-order fitting representative position data of a display device according to an embodiment of the present disclosure.

In FIG. 4A, when the photograph image SI of an ideal representative position data corresponding to an ideal coordinate of the emission display subpixel DSPe of the calibration pattern CP is measured, the photograph image SI of a measured representative position data including the golden position GP of a coordinate different from an ideal coordinate due to a measurement error is generated.

In FIG. 4B, the emission display subpixel DSPe of the first to sixth blocks BL sequentially disposed along a y-axis in a central portion of the ideal representative position data has a linearly increasing y-axis coordinate y and a constant y-axis interval Δy. The measurement emission display subpixel mDSPe of the first to sixth blocks BL sequentially disposed along a y-axis in a central portion of the measured representative position data has an irregularly increasing y-axis coordinate y and an irregular y-axis interval Δy smaller than or equal to a predetermined value.

Each block BL may include twelve display subpixels DSP. Eleven display subpixels DSP may be disposed between the emission display subpixels DSPe of two adjacent blocks BL and between the measurement emission display subpixels mDSPe of the first to sixth blocks BL. The positions of eleven display subpixels DSP may be calculated by dividing a distance between the emission display subpixels DSPe and a distance between the measurement emission display subpixels mDSPe by twelve.

In the ideal representative position data, since the emission display subpixels DSPe of each block BL are disposed with an equal interval, the non-emission display subpixels DSPn of the first to sixth blocks BL and the golden positions GP corresponding to the non-emission display subpixels DSPn are disposed with an equal interval. In the measured representative position data, although the non-emission display subpixels DSPn of each block BL and the golden positions GP corresponding to the non-emission display subpixels DSPn are disposed with an equal interval, the measurement emission display subpixels mDSPe of the first to sixth blocks BL are irregularly disposed. As a result, the non-emission display subpixels DSPn of the different blocks BL and the golden positions GP corresponding to the non-emission display subpixels DSPn are disposed with a different interval.

When a mapping is performed based on the measured representative position data and the measured entire position data calculated from the measured representative position data, the position of the display subpixel DSP of the display panel 120 is inaccurately determined and a defect compensation effect may be reduced.

In FIG. 5A, the photograph image SI of an ideal representative position data corresponding to an ideal coordinate of the emission display subpixel DSPe of the calibration pattern CP is measured. Next, when a first-order fitting is performed, a measurement error is compensated and the photograph image SI of a first-order fitting representative position data including the golden position GP of a coordinate substantially the same as an ideal coordinate is generated.

In FIG. 5B, the emission display subpixel DSPe of the first to sixth blocks BL sequentially disposed along a y-axis in a central portion of the ideal representative position data has a linearly increasing y-axis coordinate y and a constant y-axis interval Δy. The emission display subpixel DSPe of the first to sixth blocks BL sequentially disposed along a y-axis in a central portion of the first-order fitting representative position data has a linearly increasing y-axis coordinate y and a constant y-axis interval Δy.

Each block BL may include twelve display subpixels DSP. Eleven display subpixels DSP may be disposed between the emission display subpixels DSPe of two adjacent blocks BL and the positions of eleven display subpixels DSP may be calculated by dividing a distance between the emission display subpixels DSPe by twelve.

The first-order fitting may be a method of modifying the coordinate value such that the x-axis coordinate and the y-axis coordinate of the measurement emission display subpixel mDSPe of the measured representative position data make a most similar first-order graph (a straight line).

In the ideal representative position data, since the emission display subpixels DSPe of each block BL are disposed with an equal interval, the non-emission display subpixels DSPn of the first to sixth blocks BL and the golden positions GP corresponding to the non-emission display subpixels DSPn are disposed with an equal interval. In the first-order fitting representative position data, since the emission display subpixels DSPe of each block BL are disposed with an equal interval, the non-emission display subpixels DSPn of the first to sixth blocks BL and the golden positions GP corresponding to the non-emission display subpixels DSPn are disposed with an equal interval.

As a result, when a mapping is performed based on the first-order fitting representative position data and the first-order fitting entire position data calculated from the first-order fitting representative position data, a position deviation of the display subpixel DSP of the display panel 120 is compensated and a defect compensation effect may be improved.

The ideal position data may have a difference from the real position data due to a tilt and a distortion caused by a shooting system.

Figure 6A:
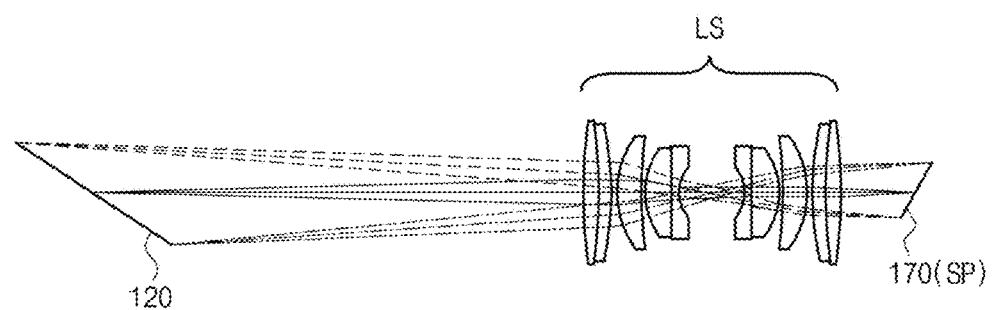
FIG. 6A is a view showing a shooting system of a display device according to an embodiment of the present disclosure.
Figure 6B:
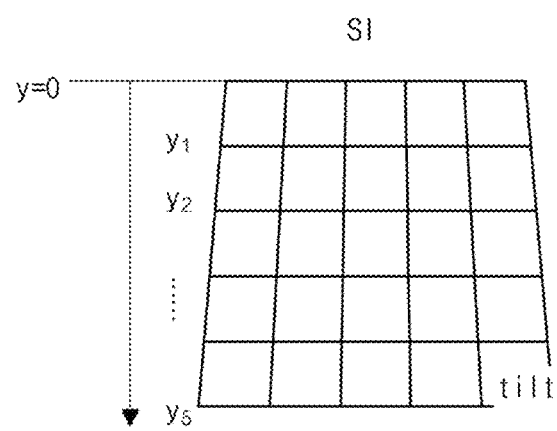
FIG. 6B is a view showing a tilt of a photograph image of a display device according to an embodiment of the present disclosure.

FIG. 6A is a view showing a shooting system of a display device according to an embodiment of the present disclosure, FIG. 6B is a view showing a tilt of a photograph image of a display device according to an embodiment of the present disclosure, and FIG. 6C is a view showing a distortion of a photograph image of a display device according to an embodiment of the present disclosure.

In FIGS. 6A and 6B, a shooting system shoots the display panel 120 of the display device 110 according to an embodiment of the present disclosure to generate the photograph image SI. Since the display panel 120 of the display device 110 is shot in a state where the display panel 120 of the display device 110 and a sensor panel SP of the camera 170 are disposed not parallel to each other, the photograph image SI having a tilt is generated.

For example, the photograph image SI where a horizontal width increases from an upper portion to a lower portion along a y-axis may be generated.

In FIGS. 6A and 6C, the shooting system includes an optical unit processing a light of the display panel 120 and transmitting the processed light to the camera 170. The photograph image SI having a distortion instead of the photograph image SI having no distortion is generated due to a plurality of lenses LS of the optical unit.

For example, in the photograph image having no distortion, a horizontal width along an x-axis and a vertical width along a y-axis of a central portion are the same as a horizontal width and a vertical width of an edge portion. In the photograph having a barrel distortion, the horizontal width along an x-axis and the vertical width along a y-axis of the central portion are greater than the horizontal width and the vertical width of the edge portion. In the photograph image SI having a pincushion distortion, the horizontal width along a x-axis and the vertical width along a y-axis of the central portion are smaller than the horizontal width and the vertical width of the edge portion.

A difference between the ideal representative position data and the real representative position data may be minimized through the fitting.

Figure 7A:
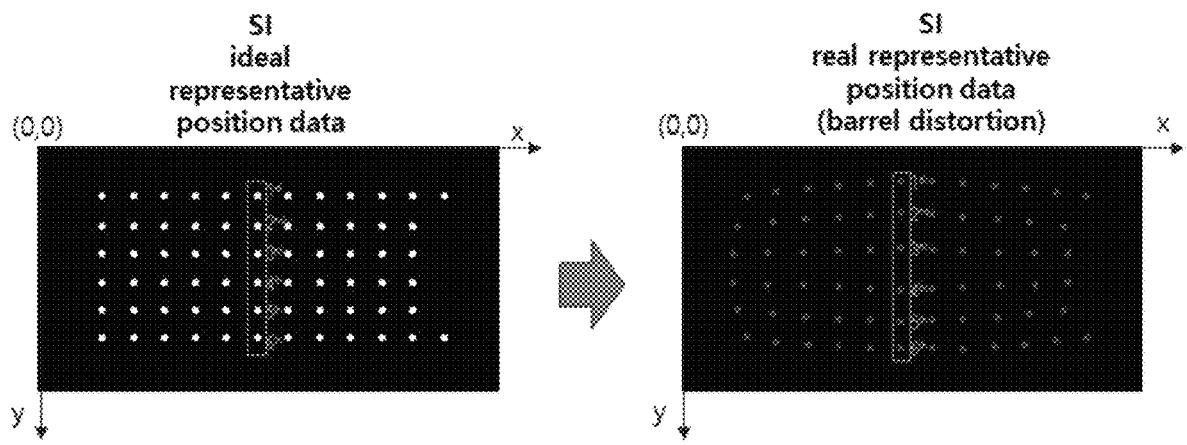
FIG. 7A is a view showing an ideal representative position data and a real representative position data reflecting a distortion of a display device according to an embodiment of the present disclosure.
Figure 7B:
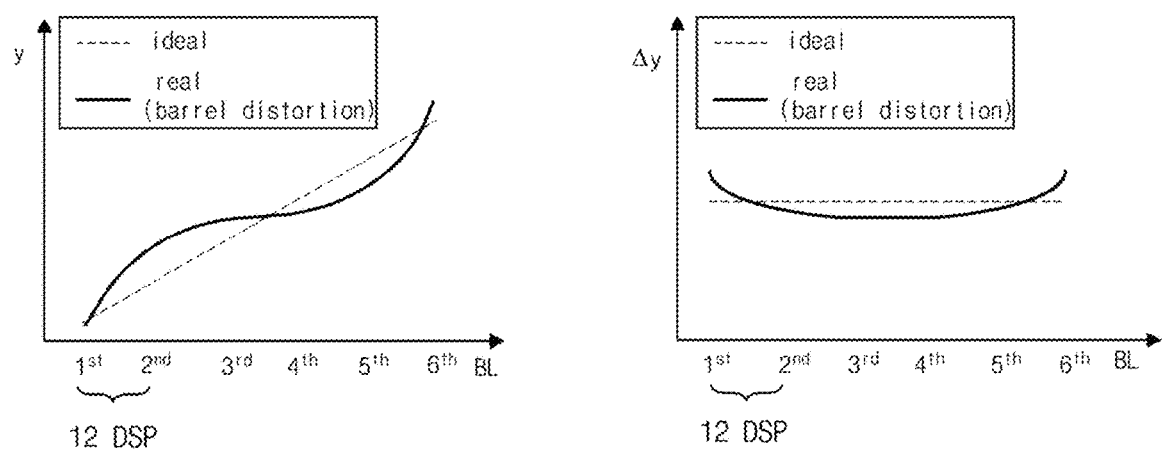
FIG. 7B is a view showing a y-axis coordinate and a y-axis interval of an ideal representative position data and a real representative position data reflecting a distortion of a display device according to an embodiment of the present disclosure.
Figure 8A:
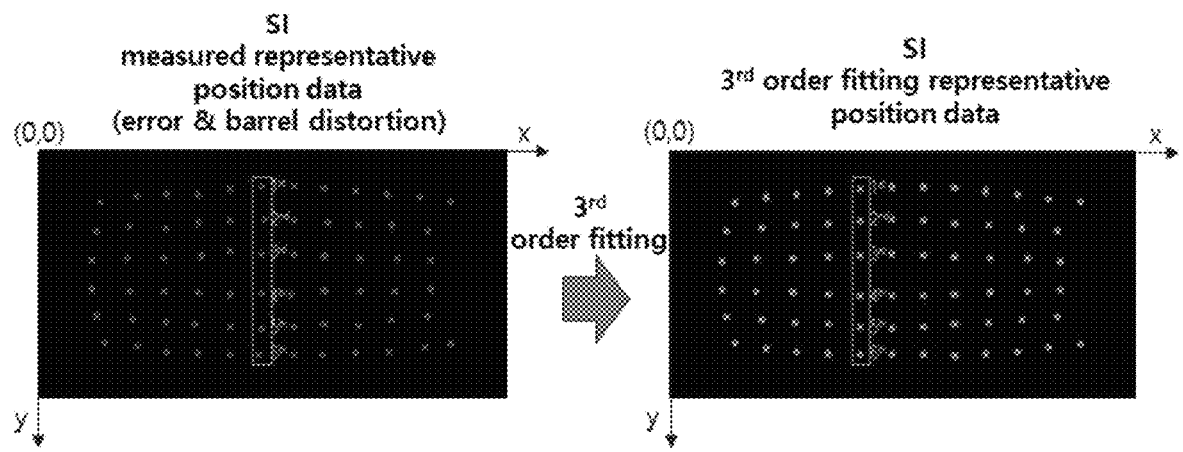
FIG. 8A is a view showing a measured representative position data and a third-order fitting representative position data of a display device according to an embodiment of the present disclosure.
Figure 8B:
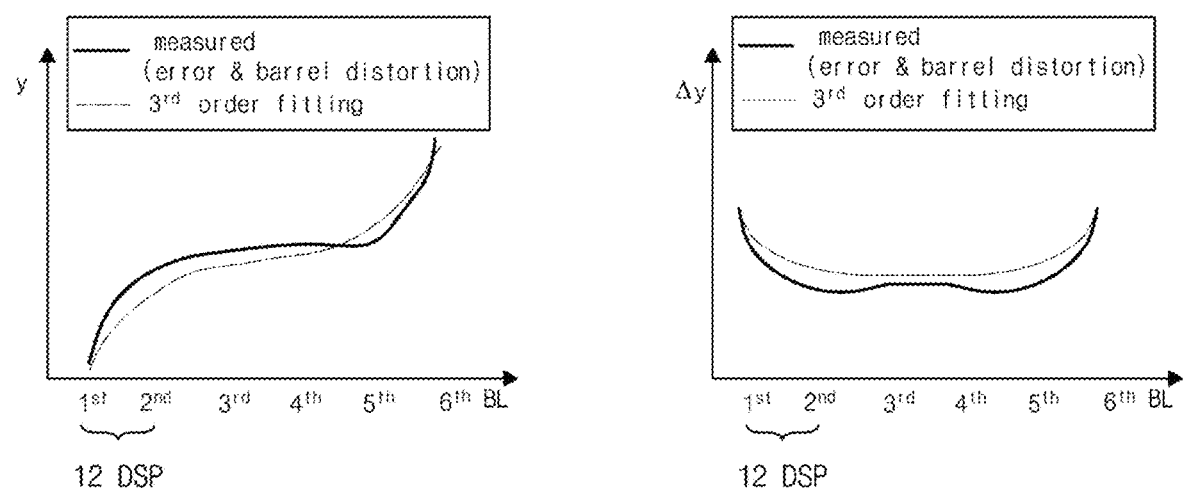
FIG. 8B is a view showing a y-axis coordinate and a y-axis interval of a measured representative position data and a third-order fitting representative position data of a display device according to an embodiment of the present disclosure.

FIG. 7A is a view showing an ideal representative position data and a real representative position data reflecting a distortion of a display device according to an embodiment of the present disclosure, and FIG. 7B is a view showing a y-axis coordinate and a y-axis interval of an ideal representative position data and a real representative position data reflecting a distortion of a display device according to an embodiment of the present disclosure. FIG. 8A is a view showing a measured representative position data and a third-order fitting representative position data of a display device according to an embodiment of the present disclosure, and FIG. 8B is a view showing a y-axis coordinate and a y-axis interval of a measured representative position data and a third-order fitting representative position data of a display device according to an embodiment of the present disclosure.

In FIG. 7A, when the display image DI of the calibration pattern CP is shot (e.g., captured), a real representative position data including the golden position GP of a coordinate different from an ideal coordinate due to a distortion instead of the photograph image SI of the ideal representative position data corresponding to the ideal coordinate of the emission display subpixel DSPe of the calibration pattern CP is generated.

In FIG. 7B, the emission display subpixel DSPe of the first to sixth blocks BL sequentially disposed along a y-axis in a central portion of the ideal representative position data has a linearly increasing y-axis coordinate y and a constant y-axis interval Δy. The measurement emission display subpixel mDSPe of the first to sixth blocks BL sequentially disposed along a y-axis in a central portion of the real representative position data has a y-axis coordinate y where a slope decreases and increases and a y-axis interval Δy that decreases and increases.

Each block BL may include twelve display subpixels DSP. Eleven display subpixels DSP may be disposed between the emission display subpixels DSPe of two adjacent blocks BL and between the measurement emission display subpixels mDSPe of the first to sixth blocks BL. The positions of eleven display subpixels DSP may be calculated by dividing a distance between the emission display subpixels DSPe and a distance between the measurement emission display subpixels mDSPe by twelve.

In the ideal representative position data, since the emission display subpixels DSPe of each block BL are disposed with an equal interval, the non-emission display subpixels DSPn of the first to sixth blocks BL and the golden positions GP corresponding to the non-emission display subpixels DSPn are disposed with an equal interval. In the real representative position data, although the non-emission display subpixels DSPn of each block BL and the golden positions GP corresponding to the non-emission display subpixels DSPn are disposed with an equal interval, the emission display subpixels DSPe of the first to sixth blocks BL are disposed with a different interval. As a result, the non-emission display subpixels DSPn of the different blocks BL and the golden positions GP corresponding to the non-emission display subpixels DSPn are disposed with a different interval.

In FIG. 8A, after the photograph image SI of the real representative position data is generated by shooting (e.g., capturing) the display image DI of the calibration pattern CP, and the photograph image SI of the measured representative position data reflecting a measurement error and a distortion is generated by shooting the photograph image SI of the real representative position data. Next, when a third-order fitting is performed for the photograph image SI of the measured representative position data, a measurement error is compensated and the photograph image SI of a third-order fitting representative position data including the golden position GP of a coordinate substantially the same as a real coordinate is generated.

In FIG. 8B, the measurement emission display subpixel mDSPe of the first to sixth blocks BL sequentially disposed along a y-axis in a central portion of the measured representative position data has a y-axis coordinate y where a slope decreases and increases differently from the ideal representative position data due to the measurement error and a y-axis interval Δy that decreases and increases differently from the ideal representative position data. The emission display subpixel DSPe of the first to sixth blocks BL sequentially disposed along a y-axis in a central portion of the third-order fitting representative position data has a y-axis coordinate y where a slope decreases and increases substantially the same as the ideal representative position data and a y-axis interval Δy that decreases and increases substantially the same as the ideal representative position data.

Each block BL may include twelve display subpixels DSP. Eleven display subpixels DSP may be disposed between the emission display subpixels DSPe of two adjacent blocks BL. The positions of eleven display subpixels DSP may be calculated by dividing a distance between the emission display subpixels DSPe by twelve.

The third-order fitting may be a method of modifying the coordinate value such that the x-axis coordinate and the y-axis coordinate of the measurement emission display subpixel mDSPe of the measured representative position data make a most similar third-order graph (a curve).

For example, a third-order fitting surface for two-dimension of an x-axis and a y-axis may be expressed as a following equation:

fitting surface$(x,y) = p00 + p10*x + p01*y + p20*x^2 + p11*xy + p02*y^2 + p30*x^3 + p21*x^2y + p12*xy^2 + p03*y^3$ (p00: zeroth-order fitting coefficient, p10, p01: first-order fitting coefficient, p20, p11, p02: second-order fitting coefficient, p30, p21, p12, p03: third-order fitting coefficient)

In the measured representative position data, the emission display subpixels DSPe of the first to sixth blocks BL and the golden positions GP corresponding to the emission display subpixels DSPe are disposed differently from the real representative position data reflecting a distortion. In the third-order fitting representative position data, the measurement error is compensated, and the emission display subpixels DSPe of the first to sixth blocks BL and the golden positions GP corresponding to the emission display subpixels DSPe are disposed substantially the same as the real representative position data.

As a result, when a mapping is performed based on the two-dimensional third-order fitting representative position data along an x-axis and a y-axis and the two-dimensional third-order fitting entire position data calculated from the two-dimensional third-order fitting representative position data, a position deviation of the display subpixel DSP of the display panel 120 is compensated and a defect compensation effect may be improved.

Figure 9A:
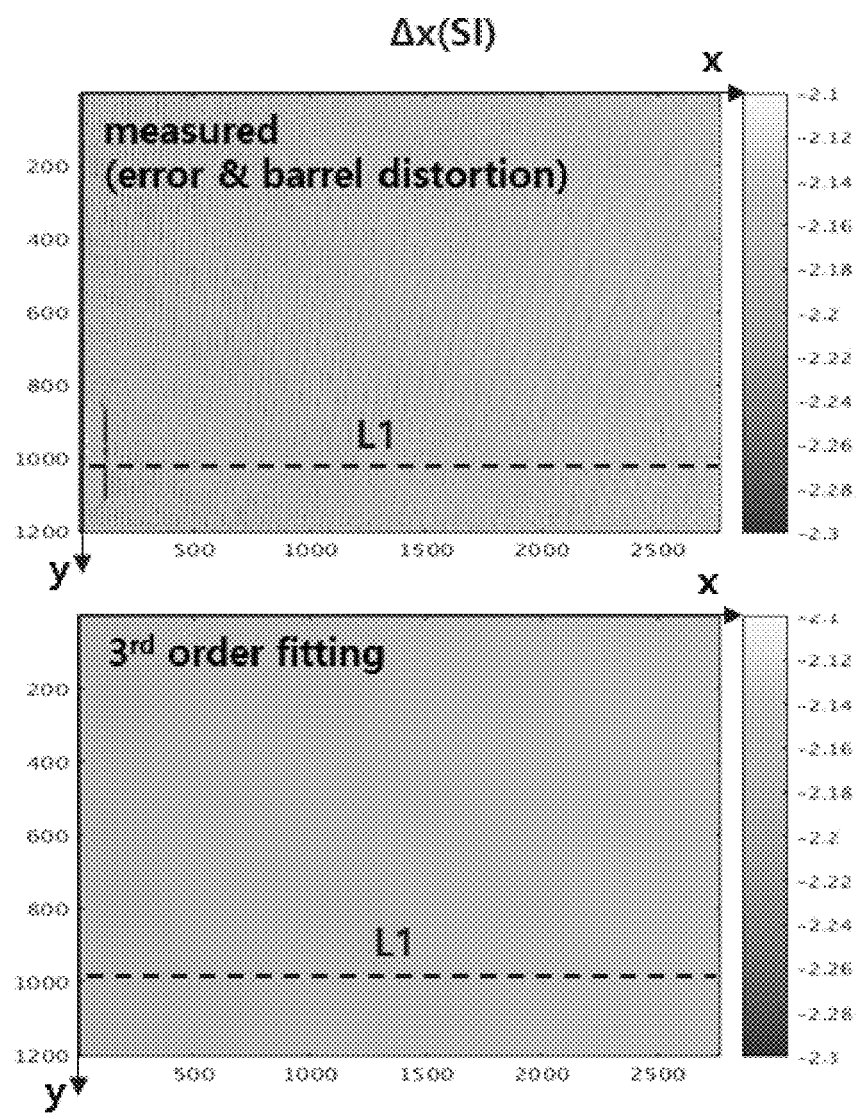
FIG. 9A is a view showing a distribution of a x-axis interval of a measured representative position data and a third-order fitting representative position data of a display device according to an embodiment of the present disclosure.
Figure 9B:
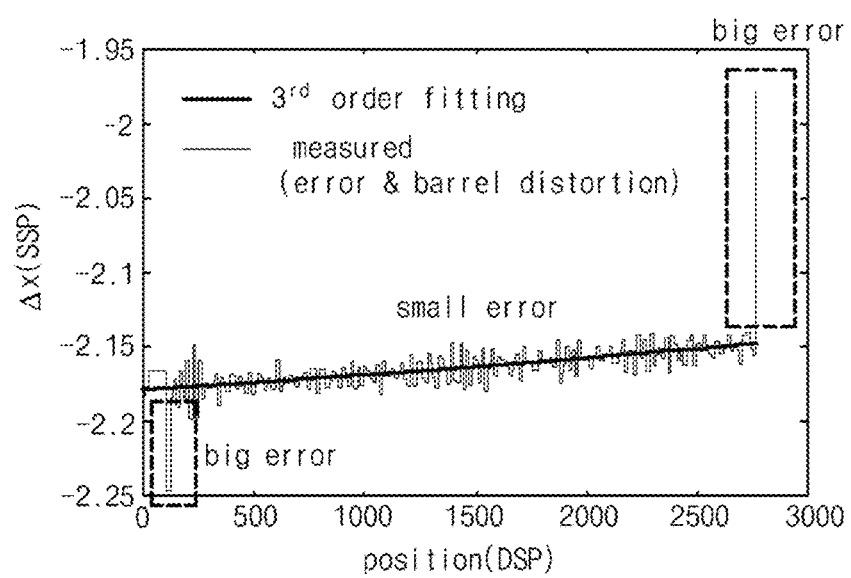
FIG. 9B is a view showing an x-axis interval along a first line of FIG. 9A according to an embodiment of the present disclosure.
Figure 9C:
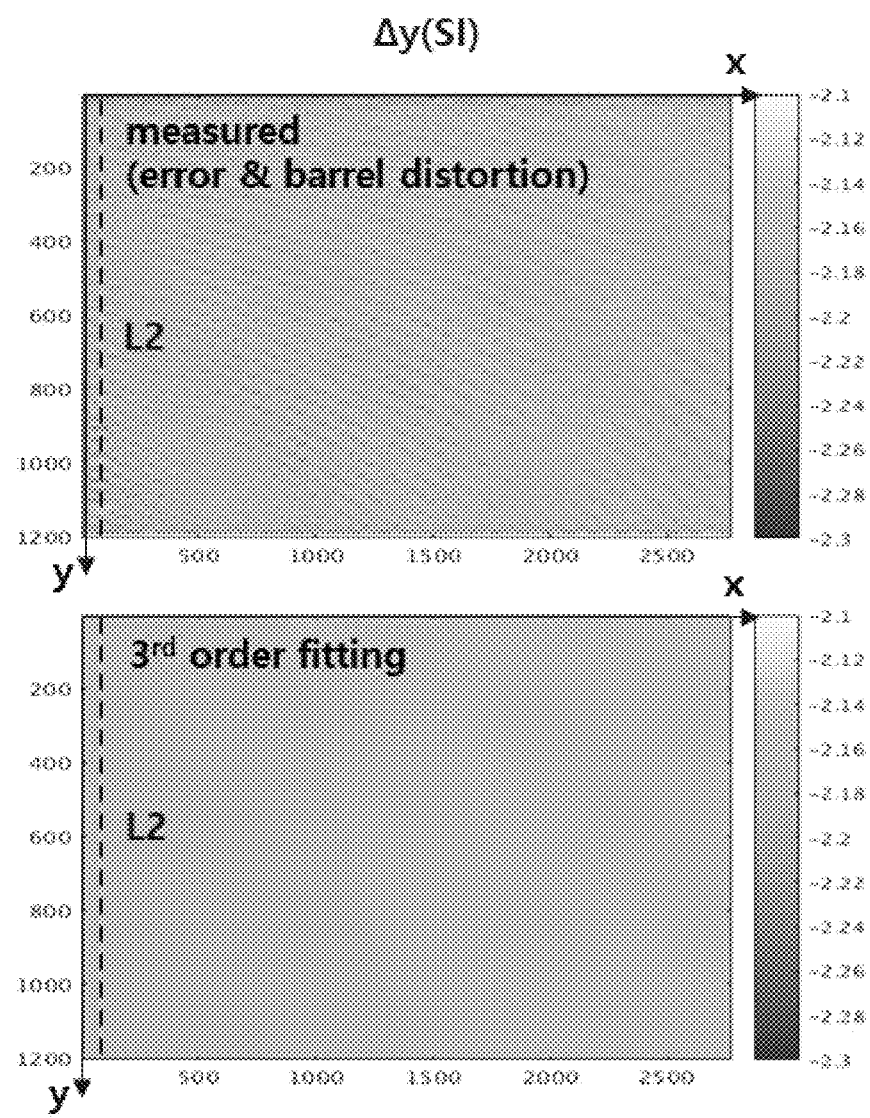
FIG. 9C is a view showing a distribution of a y-axis interval of a measured representative position data and a third-order fitting representative position data of a display device according to an embodiment of the present disclosure.
Figure 9D:
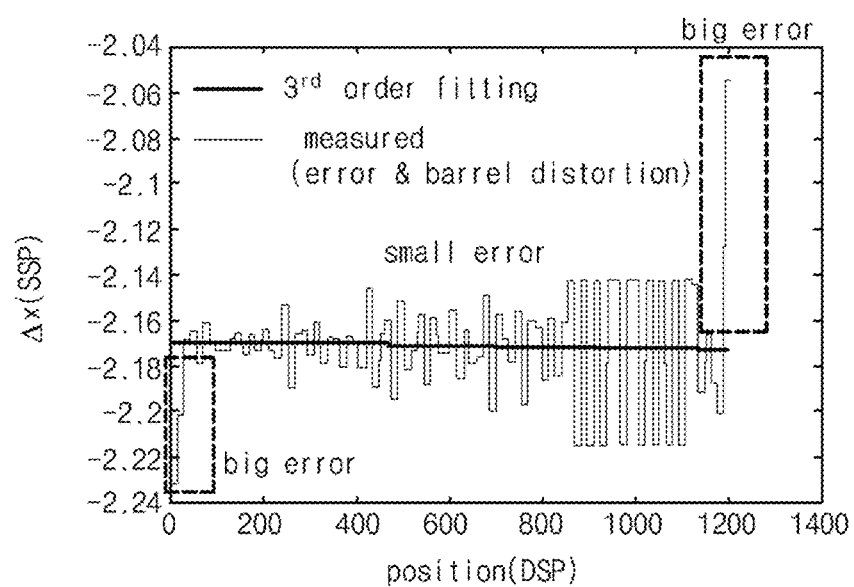
FIG. 9D is a view showing a y-axis interval along a second line of FIG. 9C according to an embodiment of the present disclosure.

FIG. 9A is a view showing a distribution of an x-axis interval of a measured representative position data and a third-order fitting representative position data of a display device according to an embodiment of the present disclosure, FIG. 9B is a view showing a x-axis interval along a first line of FIG. 9A, FIG. 9C is a view showing a distribution of a y-axis interval of a measured representative position data and a third-order fitting representative position data of a display device according to an embodiment of the present disclosure, and FIG. 9D is a view showing a y-axis interval along a second line of FIG. 9C.

In FIG. 9A, the x-axis interval Δx of the measured representative position data has an irregular distribution in the photograph image SI, and the x-axis interval Δx of the third-order fitting representative position data has a uniform distribution in the photograph image SI.

In FIG. 9B, the x-axis interval Δx along a first line L1 of the measured representative position data has a small error of the central portion and a big error of the edge portion, and the x-axis interval Δx along a first line L1 of the third-order fitting representative position data has a gradually increasing value without an error. Since second-order and third-order coefficients of the third-order fitting surface have a relatively small value, second-order and third-order terms of the third-order fitting surface may have a relatively small contribution.

In FIG. 9C, the y-axis interval Δy of the measured representative position data has an irregular distribution in the photograph image SI, and the y-axis interval Δy of the third-order fitting representative position data has a uniform distribution in the photograph image SI.

In FIG. 9D, the y-axis interval Δy along a second line L2 of the measured representative position data has a small error of the central portion and a big error of the edge portion, and the y-axis interval Δy along a second line L2 of the third-order fitting representative position data has a gradually decreasing value without an error. Since second-order and third-order coefficients of the third-order fitting surface have a relatively small value, second-order and third-order terms of the third-order fitting surface may have a relatively small contribution.

In the display device 110 according to an embodiment of the present disclosure, since the two-dimensional third-order polynomial fitting is performed along the x-axis and the y-axis for the generated measurement position data, the measurement error is removed to increase a continuity of the position data, reduce the deviation and maximize a defect compensation effect.

A shifting is performed for the photograph image.

Figure 10:
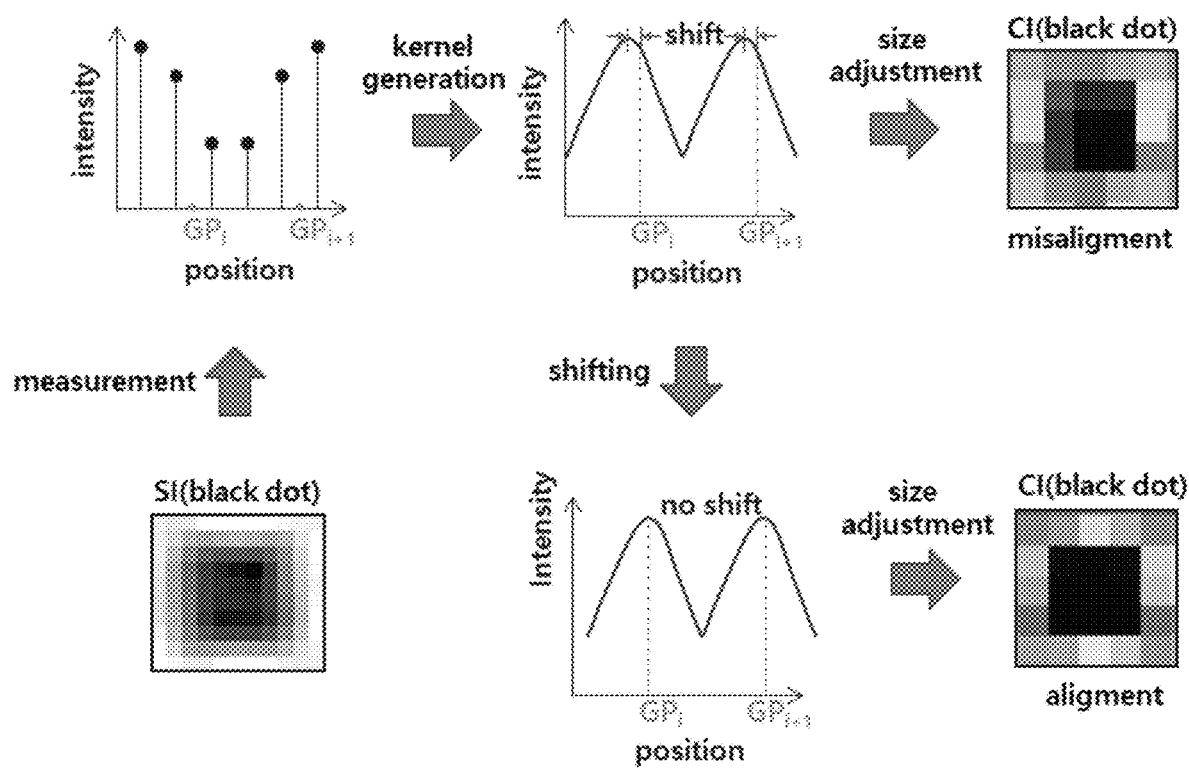
FIG. 10 is a view showing a size adjustment of a photograph image of a display device according to an embodiment of the present disclosure.

FIG. 10 is a view showing a size adjustment of a photograph image of a display device according to an embodiment of the present disclosure.

In FIG. 10, the display panel 120 displays the display image DI having a black dot of display subpixels DSP of a 3×3 size in a central portion thereof, and the camera 170 shoots the display image DI to generate the photograph image SI having the black dot in a central portion thereof.

For convenience of illustration, the black dot of the central portion of the photograph image SI is magnified in FIG. 10.

Next, a luminance of the sensor subpixels SSP of the photograph image SI having the black dot in the central portion is measured to generate a discontinuous graph of an intensity with respect to a position of the sensor subpixels SSP. The golden positions GPi and GPi+1 corresponding to the display subpixel DSP may be disposed between the sensor subpixels SSP.

Next, a continuous kernel of an intensity with respect to a position is generated from the discontinuous graph of an intensity with respect to a position of the sensor subpixels SSP through an interpolation, and a relative maximum of the kernel may be determined as the golden position GP corresponding to the display subpixel DSP.

According to an increase of a modulation transfer function (MTF), the golden position GP and the relative maximum of the kernel may not coincide with each other in each photograph image SI.

When a size of the photograph image SI where the golden position GP and the relative maximum of the kernel do not coincide with each other is adjusted (cropped), the crop image CI having a misalignment that the black dot is not exactly located at the central portion of the crop image CI is generated. As a result, an accuracy of a position detection of a defect is reduced and a defect compensation effect is deteriorated.

In an embodiment of the present disclosure, since a shifting is performed for the photograph image SI, the golden position of the display subpixel DSP and the crop subpixel CSP of the relative maximum of the kernel may exactly coincide with each other.

Since the golden position and the relative maximum of the kernel coincide with each other, the black dot is located exactly at the central portion of the crop image CI generated by adjusting (cropping) the size of the photograph image SI. As a result, an accuracy of a position detection of a defect is improved and a defect compensation effect is maximized.

The shifting for the photograph image SI may be performed by iterating (repeating) the size adjustment (crop) according to a shift value of a predetermined range.

Figure 11:
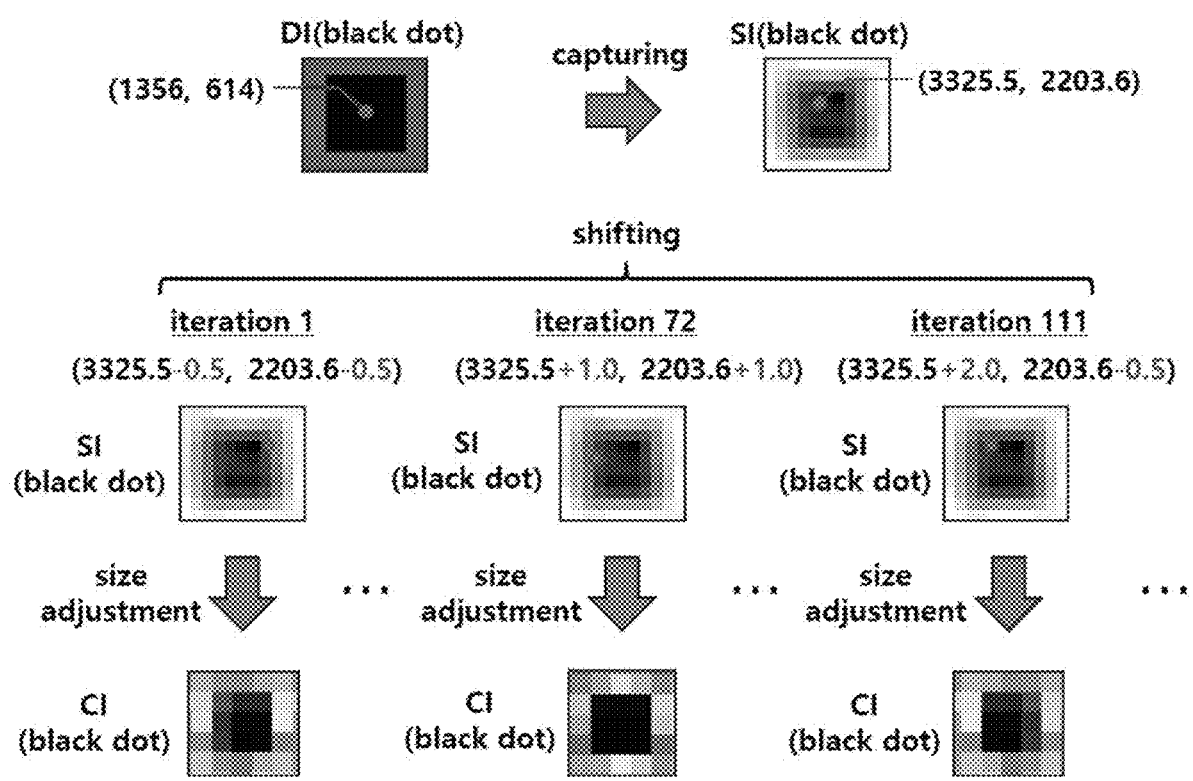
FIG. 11 is a view showing a shifting of a display device according to an embodiment of the present disclosure.
Figure 12:
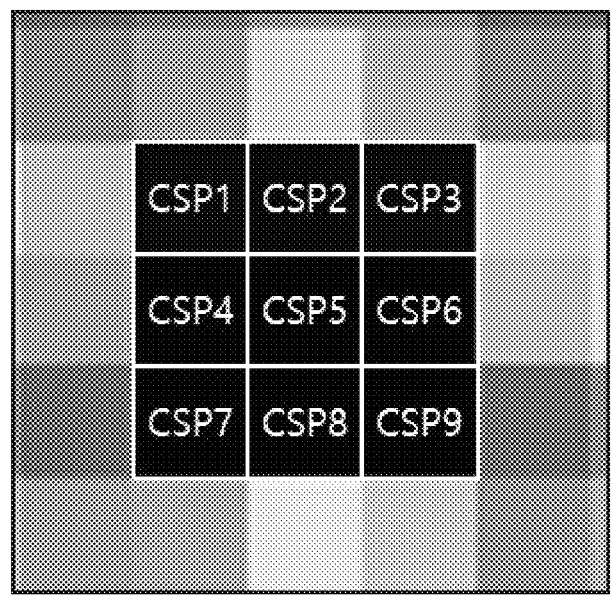
FIG. 12 is a view showing a symmetry calculation of a shifting of a display device according to an embodiment of the present disclosure.

FIG. 11 is a view showing a shifting of a display device according to an embodiment of the present disclosure, and FIG. 12 is a view showing a symmetry calculation of a shifting of a display device according to an embodiment of the present disclosure.

In FIG. 11, the photograph image SI having the black dot in the central portion thereof is generated by shooting the display image DI having the black dot of the display subpixels DSP of a 3×3 size in the central portion thereof.

For example, a center of the black dot of the display image DI may have x-axis and y-axis coordinates of (1356, 614), and a center of the black dot of the photograph image SI may have x-axis and y-axis coordinates of (3325.5, 2203.6).

After one shift value is added to the coordinates of the center of the black dot of the photograph image SI, the size adjustment (cropping) is performed for the photograph image SI to generate the crop image CI having the black dot in the central portion thereof. The symmetry calculation is performed for the black dot of the crop image CI to generate the symmetry.

The size adjustment and the symmetry calculation are iterated (repeated) using a plurality of shift values different from the one shift value.

For example, the shift value used for the size adjustment and the symmetry calculation may be within a range of about −2.0 to about +2.0.

The size adjustment and the symmetry calculation may be performed by adding the shift value of (−0.5, −0.5) to the center of the black dot of (3325.5, 2203.6) to obtain a value of (3325.5−0.5, 2203.6−0.5) in the first iteration (iteration 1), the size adjustment and the symmetry calculation may be performed by adding the shift value of (+1.0, +1.0) to the center of the black dot of (3325.5, 2203.6) to obtain a value of (3325.5+1.0, 2203.6+1.0) in the seventy-second iteration (iteration 72), and the size adjustment and the symmetry calculation may be performed by adding the shift value of (+2.0, −0.5) to the center of the black dot of (3325.5, 2203.6) to obtain a value of (3325.5+2.0, 2203.6−0.5) in the one hundred eleventh iteration (iteration 111).

In FIG. 12, the black dot of the central portion of the crop image CI may include first to ninth crop subpixels CSP1 to CSP9 of three rows and three columns. The first, fourth and seventh crop subpixels CSP1, CSP4 and CSP7 in a left column of the fifth crop subpixel CSP5 at a center of the black dot are respectively compared with the third, sixth and ninth crop subpixels CSP3, CSP6 and CSP9 in a right column of the fifth crop subpixel CSP5, and a left-right symmetry is judged from an average of a comparison result.

For example, as a following equation, an average of a ratio of a luminance minimum value (min(CSP1, CSP3)) of the first and third crop subpixels CSP1 and CSP3 with respect to a luminance maximum value (max(CSP1, CSP3)) of the first and third crop subpixels CSP1 and CSP3, a ratio of a luminance minimum value (min(CSP4, CSP6)) of the fourth and sixth crop subpixels CSP4 and CSP6 with respect to a luminance maximum value (max(CSP4, CSP6)) of the fourth and sixth crop subpixels CSP4 and CSP6 and a ratio of a luminance minimum value (min(CSP7, CSP9)) of the seventh and ninth crop subpixels CSP7 and CSP9 with respect to a luminance maximum value (max(CSP7, CSP9)) of the seventh and ninth crop subpixels CSP7 and CSP9 may be calculated as a left-right symmetry value LRSV.

$$LRSV=AVG[\{MIN(CSP1,CSP3)/MAX(CSP1, CSP3)\},\{MIN(CSP4,CSP6)/MAX(CSP4, CSP6)\},\{MIN(CSP7,CSP9)/MAX(CSP7, CSP9)\}]$$

As the left-right symmetry value LRSV is close to 1, the luminances of the crop subpixels CSP of the left and right columns are close to each other and the black dot of the crop image CI is judged to have a greater left-right symmetry.

Further, the first, second and third crop subpixels CSP1, CSP2 and CSP3 in an upper row of the fifth crop subpixel CSP5 are respectively compared with the seventh, eighth and ninth crop subpixels CSP7, CSP8 and CSP9 in a lower row of the fifth crop subpixel CSP5, and an upper-lower symmetry is judged from an average of a comparison result.

For example, as a following equation, an average of a ratio of a luminance minimum value (min(CSP1, CSP7)) of the first and seventh crop subpixels CSP1 and CSP7 with respect to a luminance maximum value (max(CSP1, CSP7)) of the first and seventh crop subpixels CSP1 and CSP7, a ratio of a luminance minimum value (min(CSP2, CSP8)) of the second and eighth crop subpixels CSP2 and CSP8 with respect to a luminance maximum value (max(CSP2, CSP8)) of the second and eighth crop subpixels CSP2 and CSP8 and a ratio of a luminance minimum value (min(CSP3, CSP9)) of the third and ninth crop subpixels CSP3 and CSP9 with respect to a luminance maximum value (max(CSP3, CSP9)) of the third and ninth crop subpixels CSP3 and CSP9 may be calculated as an up-down symmetry value UDSV.

UDSV=AVG[{MIN(CSP1,CSP7)/MAX(CSP1, CSP7)},{MIN(CSP2,CSP8)/MAX(CSP2, CSP8)},{MIN(CSP3,CSP9)/MAX(CSP3, CSP9)}]

As the up-down symmetry value UDSV is close to 1, the luminances of the crop subpixels CSP of the upper and lower rows are close to each other and the black dot of the crop image CI is judged to have a greater up-down symmetry.

As a following equation, an average value of the left-right symmetry value LRSV and the up-down symmetry value UDSV of the black dot of the crop image CI may be calculated as a total symmetry value TSV.

TSV=AVG[LRSV,UDSV]

As the total symmetry value TSV is close to 1, the luminances of the crop subpixels CSP of the left and right columns and the upper and lower rows are close to each other and the black dot of the crop image CI is judged to have a greater left-right-up-down symmetry.

Accordingly, after a plurality of total symmetry values TSV are calculated by iterating (repeating) the size adjustment and the symmetry calculation for the plurality of shift values, the shift value corresponding to the total symmetry value TSV closest to 1 (greatest total symmetry value) may be determined (e.g., set) as an optimum shift value.

For example, when the total symmetry value TSV of the seventy-second iteration (iteration 72) is greater than the total symmetry value TSV of the other iteration including the first and one hundred eleventh iterations (iteration 1, iteration 111), the crop image CI of the seventy-second iteration (iteration 72) has a greater up-down-left-right symmetry than the other iterations, and the shift value of (+1.0, +1.0) of the seventy-second iteration (iteration 72) may be determined as an optimum shift value.

In an embodiment of the present disclosure, since the shifting is performed for the photograph image SI, the golden position GP and the relative maximum of the kernel coincide with each other, and the black dot is disposed exactly at the central portion of the crop image CI. As a result, the accuracy of position detection of the defect is improved and the defect compensation effect is maximized.

Coincidence of the display subpixel and the crop subpixel according to the fitting and the shifting will be illustrated hereinafter.

Figure 13A:
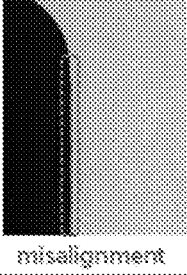
FIGS. 13A and 13B are views showing a crop image through a fitting according to an embodiment of the present disclosure.
Figure 13B:
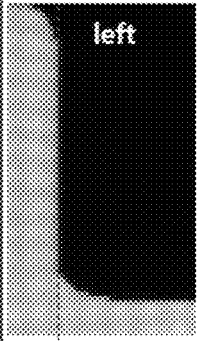
Figure 14:
FIG. 14 is a view showing a crop image through a shifting according to an embodiment of the present disclosure.

FIGS. 13A and 13B are views showing a crop image through a fitting according to an embodiment of the present disclosure, and FIG. 14 is a view showing a crop image through a shifting according to an embodiment of the present disclosure.

In FIG. 13A, since an edge portion of a notch has a curve shape or a zigzag shape instead of a straight line shape in the crop image CI of a solid pattern of a comparison example where the shifting is applied and the fitting is not applied, the edge portion of the notch has a misalignment for the display panel 120. Since the symmetry of the black dot of the central portion of the display panel 120 is deteriorated in the crop image CI of the black dot of 3×3 of a comparison example, the black dot has a misalignment for the display panel 120.

Since an edge portion of a notch has a straight line shape in the crop image CI of a solid pattern of an embodiment of the present disclosure where the shifting and the fitting are applied, the edge portion of the notch is aligned for the display panel 120. Since the symmetry of the black dot of the central portion of the display panel 120 is improved in the crop image CI of the black dot of 3×3 of an embodiment of the present disclosure, the black dot is aligned for the display panel 120.

In FIG. 13B, in the crop image CI of a solid pattern of a comparison example where the shifting is applied and the fitting is not applied, a right edge portion of a notch has a misalignment by a half (0.5) of one crop subpixel CSP for the display panel 120 and a right-up edge portion has a misalignment by one crop subpixel CSP for the display panel 120.

In the crop image CI of a solid pattern of an embodiment of the present disclosure where the shifting and the fitting are applied, an edge portion of a notch and a right-up edge portion are aligned for the display panel 120.

In FIG. 14, in the crop image CI of a grid of 3×3 of a first comparison example (comparison example 1) where the fitting is applied and the shifting is not applied, a width of a grid of high luminance (bright portion) of a left-up edge portion, a center portion and a right-up portion increases and a width of a grid of low luminance (dark portion) decreases to cause a misalignment. In the crop image CI of a black dot of 3×3 of a first comparison example, the crop subpixels CSP of low luminance (dark portion) of a left-up portion, a center portion and a right-up portion are dispersed to cause a misalignment.

In the crop image CI of a grid of 3×3 of a second comparison example (comparison example 2) where the fitting is applied and the shifting is not applied to have a random shift value, a width of a grid of high luminance (bright portion) of a left-up edge portion, a center portion and a right-up portion decreases and a width of a grid of low luminance (dark portion) increases to cause a misalignment. In the crop image CI of a black dot of 3×3 of a second comparison example, the crop subpixels CSP of low luminance (dark portion) of a left-up portion, a center portion and a right-up portion are focused on the left-up portion to cause a misalignment.

In the crop image CI of a grid of 3×3 of an embodiment of the present disclosure where the fitting and the shifting are applied, a grid of high luminance (bright portion) of a left-up edge portion, a center portion and a right-up portion and a grid of low luminance (dark portion) are aligned to have a constant width. In the crop image CI of a black dot of 3×3 of an embodiment of the present disclosure, the crop subpixels CSP of low luminance (dark portion) of a left-up portion, a center portion and a right-up portion are aligned to be focused on the center portion.

In the display device 110 according to an embodiment of the present disclosure, since the two-dimensional third-order polynomial fitting is performed along the x-axis and the y-axis for the generated measurement position data, the measurement error is removed. As a result, the continuity of the position data increases, the deviation is reduced and the defect compensation effect is maximized.

In addition, since the shifting is performed for the photograph image SI, the golden position and the relative maximum of the kernel coincide with each other and the black dot is aligned exactly at the center portion in the crop image CI. As a result, the accuracy of position detection of the defect is improved, and the defect compensation effect is maximized.

Although the shifting is performed using the photograph image SI including the black dot in an embodiment of FIGS. 10 to 14, the shifting may be performed using the photograph image SI including a white dot in another embodiment.

A range of the plurality of shift values may be differently established for red, green and blue crop subpixels CSP.

Figure 16A:
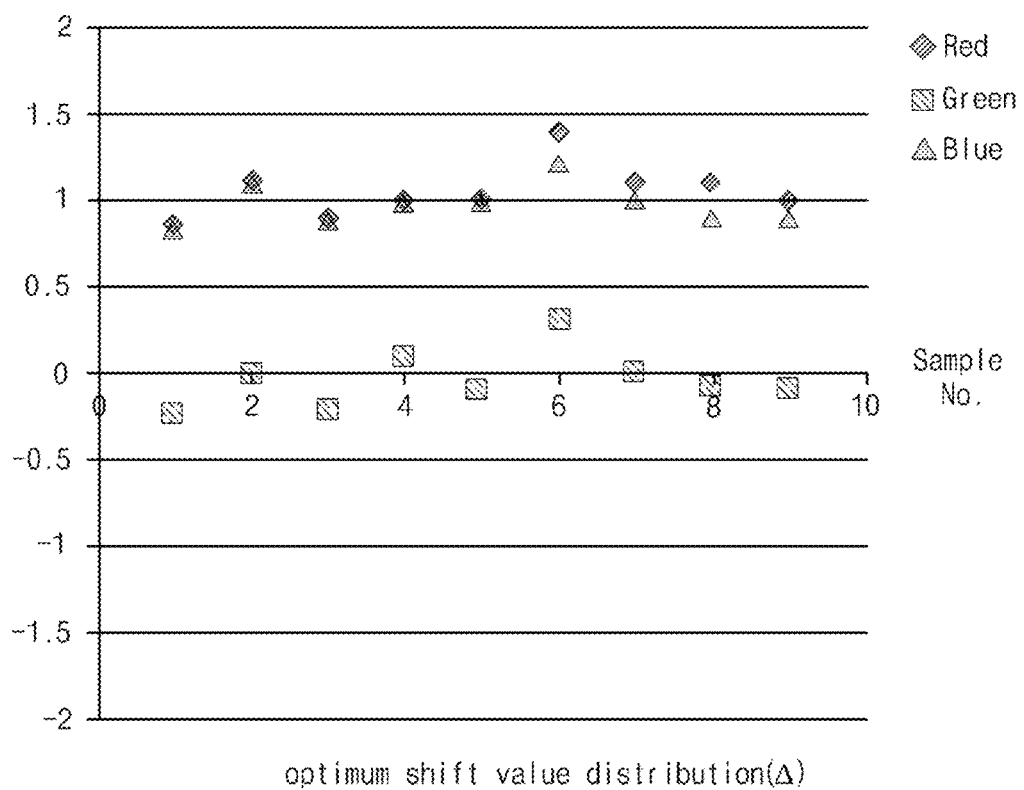
FIGS. 16A and 16B are views showing a distribution of an optimum shift value for different crop subpixels according to an embodiment of the present disclosure.
Figure 16B:
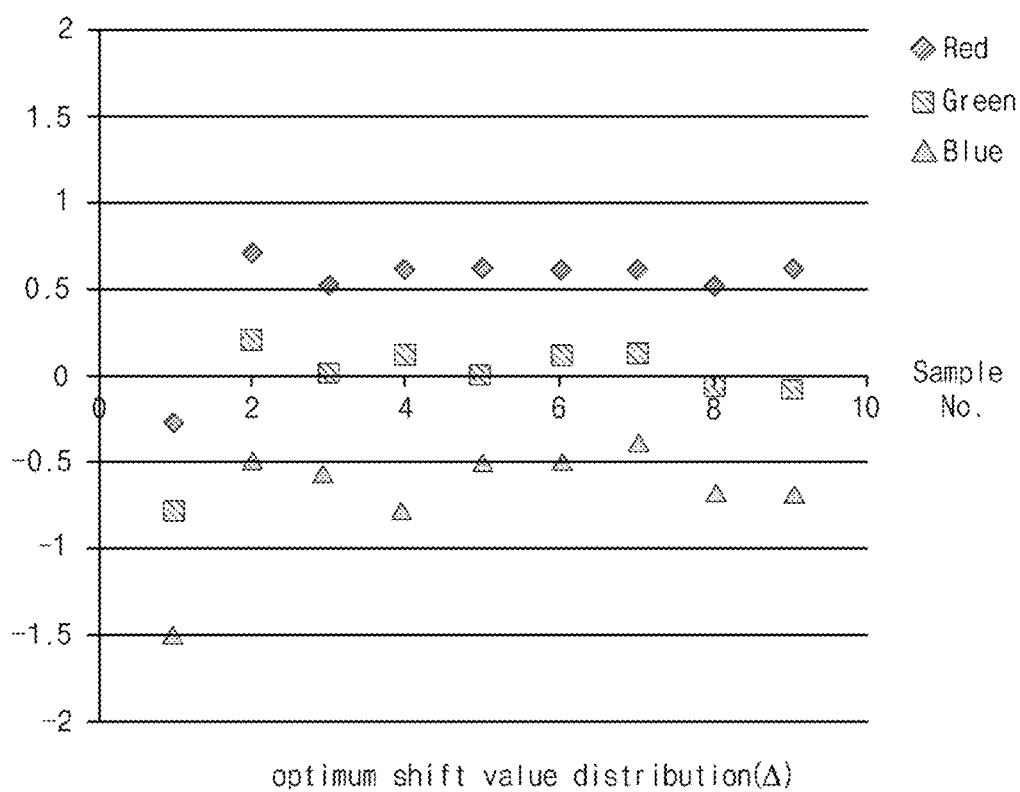

FIG. 15 is a view showing a crop subpixel and a distribution of an optimum shift value of a display device according to an embodiment of the present disclosure, and FIGS. 16A and 16B are views showing a distribution of an optimum shift value for different crop subpixels according to an embodiment of the present disclosure.

In FIG. 15, in the display device 110 of a first case (case 1), a blue crop subpixel CSP is separated from a green crop subpixel CSP of coordinates of (Sx, Sy) of a reference position by xb and yb along an x-axis and a y-axis, respectively, and a red crop subpixel CSP is separated from the green crop subpixel CSP by xr and yr along the x-axis and the y-axis, respectively.

As a result, the blue crop subpixel CSP may have coordinates of (Sx+xb, Sy+yb), where xb may be greater than 0 and smaller than or equal to 2 ($0<xb\leq2$), and yb may be greater than $-2$ and smaller than or equal to 0 ($-2<yb\leq0$).

The red crop subpixel CSP may have coordinates of (Sx+xr, Sy+yr), where xr may be greater than 0 and smaller than or equal to 2 ($0<xr\leq2$), and yr may be greater than 0 and smaller than or equal to 2 ($0<yr\leq2$).

In the display device 110 of a second case (case 2), a blue crop subpixel CSP is separated from a green crop subpixel CSP of coordinates of (Sx, Sy) of a reference position by xb and yb along an x-axis and a y-axis, respectively, and a red crop subpixel CSP is separated from the green crop subpixel CSP by xr and yr along the x-axis and the y-axis, respectively.

As a result, the blue crop subpixel CSP may have coordinates of (Sx+xb, Sy+yb), where xb may be greater than or equal to $-2$ and smaller than 0 ($-2\leq xb<0$), and yb may be greater than or equal to 0 and smaller than 2 ($0\leq yb<2$).

The red crop subpixel CSP may have coordinates of (Sx+xr, Sy+yr), where xr may be greater than or equal to $-2$ and smaller than 0 ($-2\leq xr<0$), and yr may be greater than or equal to $-2$ and smaller than 0 ($-2\leq yr<0$).

In the display device 110 of a third case (case 3), a blue crop subpixel CSP is separated from a green crop subpixel CSP of coordinates of (Sx, Sy) of a reference position by xb along an x-axis, and a red crop subpixel CSP is separated from the green crop subpixel CSP by xr along the x-axis.

As a result, the blue crop subpixel CSP may have coordinates of (Sx+xb, Sy), where xb may be greater than or equal to 0 and smaller than 2 ($0\leq xb<2$).

The red crop subpixel CSP may have coordinates of (Sx+xr, Sy), where xr may be greater than or equal to 0 and smaller than 2 ($0\leq xr<2$).

In the display device 110 of a fourth case (case 4), a blue crop subpixel CSP is separated from a green crop subpixel CSP of coordinates of (Sx, Sy) of a reference position by yb along a y-axis, and a red crop subpixel CSP is separated from the green crop subpixel CSP by yr along the y-axis.

As a result, the blue crop subpixel CSP may have coordinates of (Sx, Sy+yb), where yb may be greater than or equal to $-2$ and smaller than 0 ($-2\leq yb<0$).

The red crop subpixel CSP may have coordinates of (Sx, Sy+yr), where yr may be greater than or equal to $-2$ and smaller than 0 ($-2\leq yr<0$).

In the first to fourth cases (case 1 to case 4), each of the blue and red crop subpixels CSP has an optimum shift value within a range of $-2$ to $+2$ for the green crop subpixel CSP.

In FIG. 16A, in first to tenth samples (sample 1 to sample 10), the green crop subpixel CSP has an optimum shift value within a range of about $-0.2$ to about $+0.3$, the blue crop subpixel CSP has an optimum shift value within a range of about $+0.8$ to about $+1.2$, and the red crop subpixel CSP has an optimum shift value within a range of about $+0.8$ to about $+1.4$.

In FIG. 16B, in first to tenth samples (sample 1 to sample 10), the green crop subpixel CSP has an optimum shift value within a range of about $-0.8$ to about $+0.2$, the blue crop subpixel CSP has an optimum shift value within a range of about $-1.5$ to about $-0.4$, and the red crop subpixel CSP has an optimum shift value within a range of about $-0.3$ to about $+0.7$.

As a result, in the display device 110 according to an embodiment of the present disclosure, iteration of the shifting may be performed for the green crop subpixel CSP using a shift value within a range of about $-1.0$ to about $+1.0$ with respect to the coordinates of (Sx, Sy) of a reference position. ((Sx, Sy)±1.0)→(Sx±1.0, Sy±1.0))

In addition, iteration of the shifting may be performed for the blue and red crop subpixels CSP using a shift value within a range of about $-2.0$ to about $+2.0$ with respect to the coordinates of (Sx, Sy) of a reference position. ((Sx, Sy)±2.0)→(Sx±2.0, Sy±2.0))

Here, an interval of iteration may be determined smaller than about 0.2.

A method of compensating the display device 110 will be illustrated hereinafter.

Figure 17:
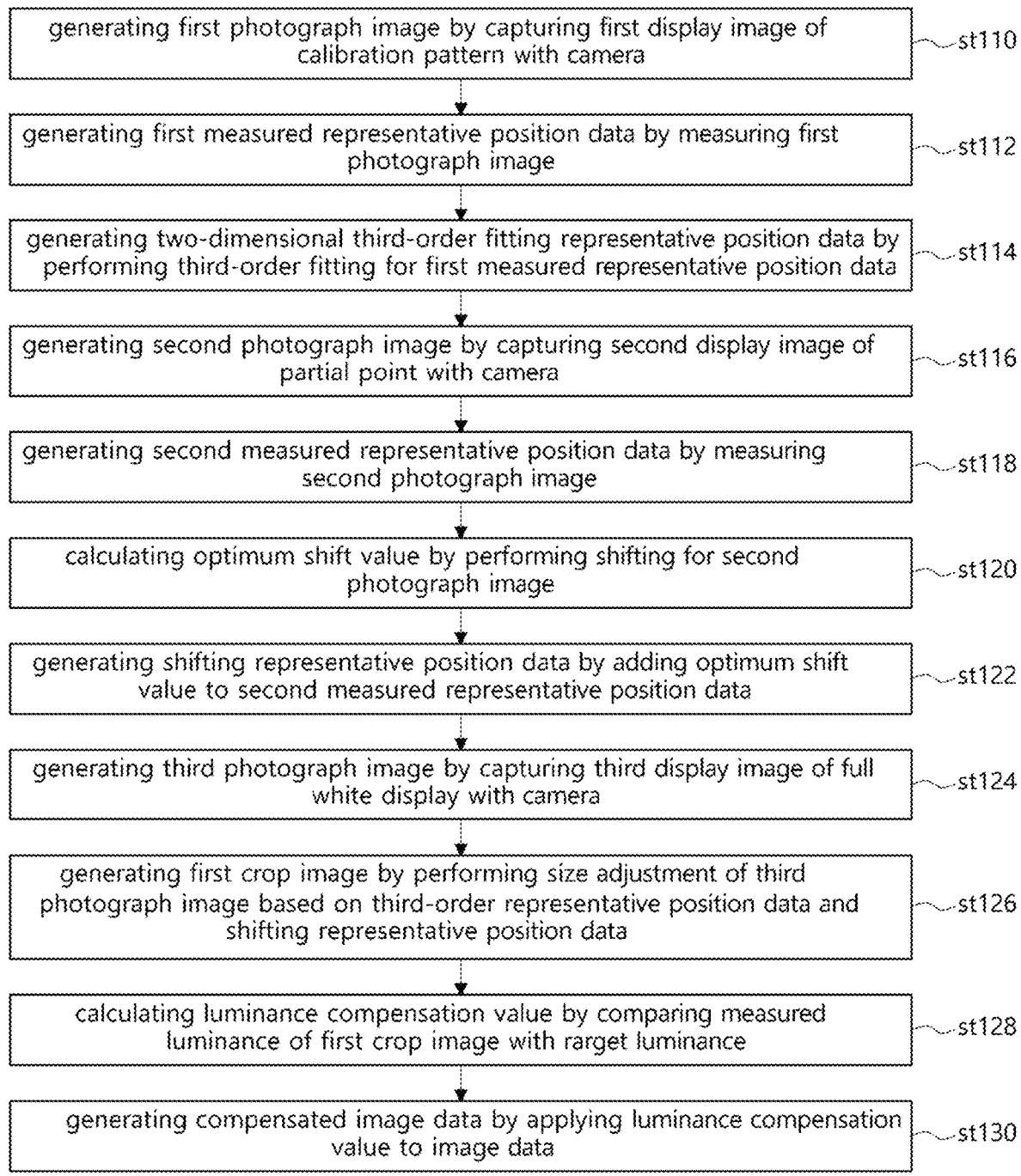
FIG. 17 is a flow chart showing a method of compensating a display device according to an embodiment of the present disclosure.

FIG. 17 is a flow chart showing a method of compensating a display device according to an embodiment of the present disclosure.

In a step st110 of FIG. 17, a first photograph image SI is generated by capturing a first display image DI of a calibration pattern CP with a camera 170. The first display image DI of the calibration pattern CP may be displayed by the display panel 120, and the calibration pattern CP may include a plurality of blocks BL.

In a step st112 of FIG. 17, a first measured representative position data corresponding to the calibration pattern CP is generated by measuring the first photograph image SI. The first measured representative position data may reflect a measurement error and a distortion.

In a step st114 of FIG. 17, a third-order fitting representative position data is generated by performing a two-dimensional third-order fitting for the first measured representative position data. The measurement error may be compensated, and a golden position GP of the third-order fitting representative position data may have a coordinate that is the same as a real coordinate.

In a step st116 of FIG. 17, a second photograph image SI is generated by capturing a second display image DI of a partial point with a camera 170. The second display image DI of the partial point may be displayed by the display panel 120, and the partial point may include a black dot of display subpixels DSP of a 3×3 size in a central portion thereof, for example.

In a step st118 of FIG. 17, a second measured representative position data corresponding to the partial point is generated by measuring the second photograph image SI.

In a step st120 of FIG. 17, an optimum shift value is calculated by performing a shifting for the second photograph image SI. A plurality of total symmetry values TSV may be calculated by iterating a size adjustment and a symmetry calculation, and a shift value corresponding to the total symmetry value TSV closest to 1 may be set as the optimum shift value.

In a step st122 of FIG. 17, a shifting representative position data is generated by adding the optimum shift value to the second measured representative position data. The golden position GP and the relative maximum of the kernel may coincide with each other, and the partial point may be located exactly at the central portion of the second photograph image.

In a step st124 of FIG. 17, a third photograph image SI is generated by capturing a third display image DI of a full white display with a camera 170. The third display image DI of the full white display may be displayed by the display panel 120.

In a step st126 of FIG. 17, a first crop image CI is generated by performing a size adjustment (cropping) of the third photograph image SI based on the third-order representative position data and the shifting representative position data.

In a step st128 of FIG. 17, a luminance compensation value is calculated by comparing a measured luminance of the first crop image with a target luminance.

In a step st130 of FIG. 17, a compensated image data is generated by applying the luminance compensation value to the image data.

Although the third-order fitting of step st114 and the shifting of step st120 are performed in an embodiment of FIG. 17, one of the third-order fitting of step st114 and the shifting of step st120 may be omitted in another embodiment.

Further, although the first display image DI of the calibration pattern CP and the second display image DI of the partial point of a black dot are displayed in an embodiment of FIG. 17, displaying the second display image DI of the partial point may be omitted in another embodiment. The first display image DI of the calibration pattern CP may include a white dot of display subpixels DSP of a 3×3 size in a central portion thereof as the partial point, and the second photograph image SI may be generated by capturing the first display image DI of the white dot.

Consequently, in the method of compensating the display device according to an embodiment of the present disclosure, since the two-dimensional third-order polynomial fitting is performed for the generated position data, the error of the position data is removed, the continuity of the position data increases, the deviation is reduced and the defect compensation effect is maximized.

In addition, since the shifting through the symmetry calculation is performed for the generated position data, alignment of the position data and the kernel is improved, the deviation between the photograph images is reduced, and the defect compensation effect is maximized.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A method of compensating a display device, comprising:
   displaying a first display image of a calibration pattern using a display device, the display device including a plurality of display subpixels;
   generating a first photograph image of the calibration pattern by capturing the first display image using a camera, the camera including a plurality of sensor subpixels;
   generating a measurement representative position data corresponding to the calibration pattern by measuring the first photograph image;
   generating a third-order fitting representative position data by performing a two-dimensional third-order fitting for the measurement representative position data;
   displaying a second display image of a full white display using the display device;
   generating a second photograph image of the full white display by capturing the second display image using the camera;
   generating a first crop image by performing a first size adjustment of the second photograph image based on the third-order fitting representative position data;
   calculating a luminance compensation value by comparing a measured luminance of the first crop image with a target luminance; and
   generating a compensated image data by applying the luminance compensation value to an image data.

2. The method of claim 1, wherein a fitting surface according to an x-axis and a y-axis of the two-dimensional third-order fitting is expressed by a following equation:

$$\text{fitting surface}(x,y) = p00 + p10*x + p01*y + p20*x^2 + p11*xy + p02*y^2 + p30*x^3 + p21*x^2y + p12*xy^2 + p03*y^3,$$

wherein p00 is a zeroth-order fitting coefficient, p10 and p01 are first-order fitting coefficients, p20, p11, and p02 are second-order fitting coefficients, and p30, p21, p12, and p03 are third-order fitting coefficients.

3. The method of claim 1, wherein the first display image of the calibration pattern includes a plurality of blocks along a x-axis and a y-axis, and
   wherein each of the plurality of blocks includes one emission display subpixel and a plurality of non-emission display subpixels.

4. The method of claim 3, further comprising:
   generating an entire position data by dividing a distance between the third-order fitting representative position data corresponding to an emission display subpixel of two adjacent blocks from the plurality of blocks with an equal interval.

5. The method of claim 1, further comprising:
   displaying a third display image of a partial point using the display device;
   generating a third photograph image of the partial point by capturing the third display image using the camera; and
   calculating an optimum shift value by performing a shifting for the third photograph image.

6. The method of claim 5, wherein calculating the optimum shift value comprises:
generating a second crop image by adding a first shift value to coordinates of a center of the partial point of the third photograph image and performing a second size adjustment of the third photograph image;
calculating a first total symmetry value by performing a symmetry calculation of the partial point of the second crop image;
calculating a plurality of total symmetry values that are different from the first total symmetry value by iterating the second size adjustment and the symmetry calculation using a plurality of shift values that are different from the first shift value; and
setting a greatest value among the first total symmetry value and the plurality of total symmetry values as the optimum shift value.

7. The method of claim 6, wherein the partial point of the second crop image includes a first crop subpixel to ninth crop subpixel arranged as three rows and three columns, and calculating the first total symmetry value comprises:
calculating a first average of a first ratio of a luminance minimum value of the first crop subpixel and the third crop subpixel with respect to a luminance maximum value of the first crop subpixel and the third crop subpixel, a second ratio of a luminance minimum value of the fourth crop subpixel and the sixth crop subpixel with respect to a luminance maximum value of the fourth crop subpixel and the sixth crop subpixel, and a third ratio of a luminance minimum value of the seventh crop subpixel and the ninth crop subpixel with respect to a luminance maximum value of the seventh crop subpixel and the ninth crop subpixel as a left-right symmetry value;
calculating a second average of a fourth ratio of a luminance minimum value of the first crop subpixel and the seventh crop subpixel with respect to a luminance maximum value of the first crop subpixel and the seventh crop subpixel, a fifth ratio of a luminance minimum value of the second crop subpixel and the eighth crop subpixel with respect to a luminance maximum value of the second crop subpixel and the eighth crop subpixel and a sixth ratio of a luminance minimum value of the third crop subpixel and the ninth crop subpixel with respect to a luminance maximum value of the third crop subpixel and the ninth crop subpixel as an up-down symmetry value; and
calculating an average value of the left-right symmetry value and the up-down symmetry value as the first total symmetry value.

8. The method of claim 6, wherein the second crop image includes a red crop subpixel, a green crop subpixel, and a blue crop subpixel,
wherein the second size adjustment and the symmetry calculation are iterated for the green crop subpixel using the first shift value and the plurality of shift values within a range of −1.0 to +1.0, and
wherein the second size adjustment and the symmetry calculation are iterated for the blue crop subpixel and the red crop subpixel using the first shift value and the plurality of shift values within a range of −2.0 to +2.0.

9. A method of compensating a display device, comprising:
displaying a first display image of a calibration pattern using a display device, the display device including a plurality of display subpixels;
generating a first photograph image of the calibration pattern by capturing the first display image using a camera, the camera including a plurality of sensor subpixels;
generating a first measurement representative position data corresponding to the calibration pattern by measuring the first photograph image;
displaying a second display image of a partial point using the display device;
generating a second photograph image of the partial point by capturing the second display image using the camera;
generating a second measurement representative position data by measuring the second photograph image;
calculating an optimum shift value by performing a shifting for the second photograph image;
generating a shifting representative position data by adding the optimum shift value to the second measurement representative position data;
displaying a third display image of a full white display using the display device;
generating a third photograph image of the full white display by capturing the third display image using the camera;
generating a first crop image by performing a size adjustment of the third photograph image based on the shifting representative position data;
calculating a luminance compensation value by comparing a measured luminance of the first crop image with a target luminance; and
generating a compensated image data by applying the luminance compensation value to an image data.

* * * * *